US007426308B2

(12) United States Patent  
Hsu et al.

(10) Patent No.: US 7,426,308 B2  
(45) Date of Patent: Sep. 16, 2008

(54) INTRAFRAME AND INTERFRAME INTERLACE CODING AND DECODING

(75) Inventors: Pohsiang Hsu, Redmond, WA (US); Bruce Chih-Lung Lin, Redmond, WA (US); Thomas W. Holcomb, Bothell, WA (US); Kunal Mukerjee, Redmond, WA (US); Sridhar Srinivasan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 10/622,284

(22) Filed: Jul. 18, 2003

(65) Prior Publication Data

US 2005/0013497 A1 Jan. 20, 2005

(51) Int. Cl.  
*G06K 9/36* (2006.01)

(52) U.S. Cl. ...................................... 382/239; 382/238

(58) Field of Classification Search ......... 382/236–240; 375/240.01, 240–29  
See application file for complete search history.

(56) References Cited

U.S. PATENT DOCUMENTS

| 4,454,546 | A | 6/1984 | Mori |
| 4,661,849 | A | 4/1987 | Hinman |
| 4,661,853 | A | 4/1987 | Roeder et al. |
| 4,691,329 | A | 9/1987 | Juri et al. |
| 4,695,882 | A | 9/1987 | Wada et al. |
| 4,796,087 | A | 1/1989 | Guichard et al. |
| 4,800,432 | A | 1/1989 | Barnett et al. |
| 4,849,812 | A | 7/1989 | Borgers et al. |
| 4,862,267 | A | 8/1989 | Gillard et al. |
| 4,864,393 | A | 9/1989 | Harradine et al. |
| 5,021,879 | A | 6/1991 | Vogel |
| 5,068,724 | A | 11/1991 | Krause et al. |
| 5,091,782 | A | 2/1992 | Krause et al. |
| 5,103,306 | A | 4/1992 | Weiman et al. |
| 5,157,490 | A | 10/1992 | Kawai et al. |
| 5,175,618 | A | 12/1992 | Ueda |
| 5,223,949 | A | 6/1993 | Honjo |
| 5,258,836 | A | 11/1993 | Murata |
| 5,298,991 | A | 3/1994 | Yagasaki et al. |
| 5,412,430 | A | 5/1995 | Nagata |
| RE34,965 | E | 6/1995 | Sugiyama |

(Continued)

FOREIGN PATENT DOCUMENTS

EP  0 279 053  8/1988

(Continued)

OTHER PUBLICATIONS

U.S. Appl. No. 60/488,710, filed Jul. 18, 2003, Srinivasan et al.

(Continued)

*Primary Examiner*—Jingge Wu  
*Assistant Examiner*—Jayesh A Patel  
(74) *Attorney, Agent, or Firm*—Klarquist Sparkman, LLP

(57) ABSTRACT

Techniques and tools for encoding and decoding video images (e.g., interlaced frames) are described. For example, a video encoder or decoder processes 4:1:1 format macroblocks comprising four 8×8 luminance blocks and four 4×8 chrominance blocks. In another aspect, fields in field-coded macroblocks are coded independently of one another (e.g., by sending encoded blocks in field order). Other aspects include DC/AC prediction techniques and motion vector prediction techniques for interlaced frames.

27 Claims, 14 Drawing Sheets

U.S. PATENT DOCUMENTS

| | | | |
|---|---|---|---|
| 5,422,676 A | 6/1995 | Herpel et al. | |
| 5,424,779 A | 6/1995 | Odaka | |
| 5,428,396 A | 6/1995 | Yagasaki | |
| 5,442,400 A | 8/1995 | Sun | |
| 5,448,297 A | 9/1995 | Alattar et al. | |
| 5,461,421 A | 10/1995 | Moon | |
| RE35,093 E | 11/1995 | Wang et al. | |
| 5,467,086 A | 11/1995 | Jeong | |
| 5,467,136 A | 11/1995 | Odaka | |
| 5,477,272 A | 12/1995 | Zhang | |
| RE35,158 E | 2/1996 | Sugiyama | |
| 5,510,840 A | 4/1996 | Yonemitsu et al. | |
| 5,539,466 A | 7/1996 | Igarashi et al. | |
| 5,544,286 A | 8/1996 | Laney | |
| 5,552,832 A | 9/1996 | Astle | |
| 5,565,922 A | 10/1996 | Krause | |
| 5,594,504 A | 1/1997 | Ebrahimi | |
| 5,623,311 A | 4/1997 | Phillips et al. | |
| 5,659,365 A | 8/1997 | Wilkinson | |
| 5,666,461 A | 9/1997 | Igarashi et al. | |
| 5,668,932 A | 9/1997 | Laney | |
| 5,673,370 A | 9/1997 | Laney | |
| 5,692,063 A | 11/1997 | Lee et al. | |
| 5,699,476 A | 12/1997 | Van Der Meer | |
| 5,701,164 A | 12/1997 | Kato | |
| 5,748,789 A | 5/1998 | Lee et al. | |
| 5,764,814 A | 6/1998 | Chen et al. | |
| 5,784,175 A | 7/1998 | Lee | |
| 5,787,203 A | 7/1998 | Lee et al. | |
| 5,796,855 A | 8/1998 | Lee | |
| 5,799,113 A | 8/1998 | Lee | |
| RE35,910 E | 9/1998 | Nagata et al. | |
| 5,825,929 A | 10/1998 | Chen et al. | |
| 5,835,145 A | 11/1998 | Ouyang et al. | |
| 5,844,613 A | 12/1998 | Chaddha | |
| 5,847,776 A | 12/1998 | Khmelnitsky | |
| 5,874,995 A | 2/1999 | Naimpally et al. | |
| 5,901,248 A | 5/1999 | Fandrianto et al. | |
| 5,929,940 A | 7/1999 | Jeannin | |
| 5,946,042 A | 8/1999 | Kato | |
| 5,946,043 A | 8/1999 | Lee et al. | |
| 5,946,419 A | 8/1999 | Chen et al. | |
| 5,949,489 A | 9/1999 | Nishikawa et al. | |
| 5,959,673 A | 9/1999 | Lee | |
| 5,959,674 A * | 9/1999 | Jang et al. | 375/240.2 |
| 5,963,258 A | 10/1999 | Nishikawa et al. | |
| 5,963,673 A | 10/1999 | Kodama et al. | |
| 5,970,173 A | 10/1999 | Lee et al. | |
| 5,970,175 A | 10/1999 | Nishikawa et al. | |
| 5,973,743 A | 10/1999 | Han | |
| 5,973,755 A | 10/1999 | Gabriel | |
| 5,974,184 A * | 10/1999 | Eifrig et al. | 382/236 |
| 5,982,437 A | 11/1999 | Okazaki et al. | |
| 5,982,438 A | 11/1999 | Lin et al. | |
| 5,990,960 A | 11/1999 | Murakami et al. | |
| 5,991,447 A | 11/1999 | Eifrig et al. | |
| 6,002,439 A | 12/1999 | Murakami et al. | |
| 6,005,980 A | 12/1999 | Eifrig et al. | |
| RE36,507 E | 1/2000 | Iu | |
| 6,011,596 A | 1/2000 | Burl | |
| 6,026,195 A | 2/2000 | Eifrig et al. | |
| 6,040,863 A | 3/2000 | Kato | |
| 6,067,322 A | 5/2000 | Wang | |
| 6,094,225 A | 7/2000 | Han | |
| RE36,822 E | 8/2000 | Sugiyama | |
| 6,097,759 A | 8/2000 | Murakami et al. | |
| 6,130,963 A | 10/2000 | Uz et al. | |
| 6,148,109 A | 11/2000 | Boon et al. | |
| 6,154,495 A | 11/2000 | Yamaguchi et al. | |
| 6,188,725 B1 | 2/2001 | Sugiyama | |
| 6,188,794 B1 | 2/2001 | Nishikawa et al. | |
| 6,201,927 B1 | 3/2001 | Comer | |
| 6,205,176 B1 | 3/2001 | Sugiyama | |
| 6,208,761 B1 | 3/2001 | Passagio et al. | |
| 6,215,905 B1 * | 4/2001 | Lee et al. | 382/238 |
| 6,219,070 B1 | 4/2001 | Baker et al. | |
| 6,219,464 B1 | 4/2001 | Greggain et al. | |
| 6,233,017 B1 | 5/2001 | Chaddha | |
| RE37,222 E | 6/2001 | Yonemitsu | |
| 6,243,418 B1 | 6/2001 | Kim | |
| 6,259,810 B1 | 7/2001 | Gill et al. | |
| 6,263,024 B1 | 7/2001 | Matsumoto | |
| 6,271,885 B2 | 8/2001 | Sugiyama | |
| 6,275,531 B1 | 8/2001 | Li | |
| 6,281,942 B1 | 8/2001 | Wang | |
| 6,282,243 B1 | 8/2001 | Kazui et al. | |
| 6,292,585 B1 | 9/2001 | Yamaguchi et al. | |
| 6,295,376 B1 | 9/2001 | Nakaya | |
| 6,304,928 B1 | 10/2001 | Mairs et al. | |
| 6,307,887 B1 | 10/2001 | Gabriel | |
| 6,307,973 B2 | 10/2001 | Nishikawa et al. | |
| 6,320,593 B1 | 11/2001 | Sachs et al. | |
| 6,324,216 B1 | 11/2001 | Igarashi | |
| 6,337,881 B1 | 1/2002 | Chaddha | |
| 6,347,116 B1 | 2/2002 | Haskell et al. | |
| 6,377,628 B1 | 4/2002 | Schultz et al. | |
| 6,381,279 B1 | 4/2002 | Taubman | |
| 6,404,813 B1 | 6/2002 | Haskell et al. | |
| 6,418,166 B1 | 7/2002 | Wu et al. | |
| 6,430,316 B1 | 8/2002 | Wilkinson | |
| 6,441,842 B1 | 8/2002 | Fandrianto et al. | |
| 6,496,601 B1 | 12/2002 | Migdal et al. | |
| 6,529,632 B1 | 3/2003 | Nakaya et al. | |
| 6,539,056 B1 | 3/2003 | Sato et al. | |
| 6,563,953 B2 | 5/2003 | Lin et al. | |
| 6,571,019 B1 | 5/2003 | Kim et al. | |
| 6,573,905 B1 | 6/2003 | MacInnis et al. | |
| 6,647,061 B1 | 11/2003 | Panusopone et al. | |
| 6,650,781 B2 | 11/2003 | Nakaya | |
| 6,728,317 B1 | 4/2004 | Demos | |
| 2002/0168066 A1 | 11/2002 | Li | |
| 2002/0186890 A1 | 12/2002 | Lee et al. | |
| 2003/0099292 A1 | 5/2003 | Wang et al. | |
| 2003/0112864 A1 | 6/2003 | Karczewicz et al. | |
| 2003/0113026 A1 | 6/2003 | Srinivasan et al. | |
| 2003/0142748 A1 | 7/2003 | Tourapis | |
| 2003/0152146 A1 | 8/2003 | Lin et al. | |
| 2003/0156646 A1 | 8/2003 | Hsu et al. | |
| 2004/0042549 A1 | 3/2004 | Huang et al. | |
| 2004/0136457 A1 | 7/2004 | Funnell et al. | |
| 2004/0141654 A1 * | 7/2004 | Jeng | 382/238 |
| 2005/0013497 A1 | 1/2005 | Hsu et al. | |
| 2005/0013498 A1 | 1/2005 | Srinivasan | |
| 2005/0036759 A1 | 2/2005 | Lin et al. | |
| 2005/0053156 A1 | 3/2005 | Lin et al. | |
| 2005/0100093 A1 | 5/2005 | Holcomb | |
| 2006/0013307 A1 | 1/2006 | Olivier et al. | |

FOREIGN PATENT DOCUMENTS

| | | |
|---|---|---|
| EP | 0397402 | 11/1990 |
| EP | 0526163 | 2/1993 |
| EP | 0535746 | 4/1993 |
| EP | 0 830 029 | 3/1998 |
| EP | 0863675 | 9/1998 |
| EP | 0884912 | 12/1998 |
| GB | 2343579 | 5/2000 |
| JP | 61205086 | 9/1986 |
| JP | 62 213 494 | 9/1987 |
| JP | 3001688 | 1/1991 |
| JP | 3 129 986 | 3/1991 |
| JP | 6 078 298 | 3/1994 |
| JP | 6078295 | 3/1994 |
| JP | 7274171 | 10/1995 |

| | | |
|---|---|---|
| JP | 10 056 644 | 2/1998 |
| JP | 6292188 | 10/2004 |
| KR | 1003538510000 | 1/2002 |
| WO | WO 00/33581 | 8/2000 |
| WO | WO 03/026296 | 3/2003 |

OTHER PUBLICATIONS

Hsu et al., "A Low Bit-Rate Video Codec Based on Two-Dimensional Mesh Motion Compensation with Adaptive Interpolation," IEEE, Transactions on Circuits and Systems for Video Technology, vol. II, No. 1, pp. 111-117 (Jan. 2001).

Sjoberg et al., "Run-length Coding of Skipped Macroblocks," ITU-T SG16/Q.6 VCEG-M57, pp. 1-5 (Apr. 2001).

U.S. Appl. No. 60/341,674, filed Dec. 17, 2001, Lee et al.

Bartkowiak et al., "Color Video Compression Based on Chrominance Vector Quantization," *7th Int'l Workshop on Systems, Signals and Image Processing, IWSSIP 2000*, Maribor 7-9 VI, pp. 107-110 (2000).

Benzler et al., "Improving multiresolution motion compensating hybrid coding by drift reduction," *Picture Coding Symposium*, 4 pp. (1996).

Benzler et al., "Motion and aliasing compensating prediction with quarter-pel accuracy and adaptive overlapping blocks as proposal for MPEG-4 tool evaluation—Technical description," ISO/IEC JTC1/SC29/WG11, MPEG 95/0552, 5 pp., document marked 1995.

Benzler , "Results of core experiment P8 (Motion an Aliasing compensating Prediction)," ISO/IEC JTC1/SC29/WG11, MPEG97/2625, 8 pp., document marked 1997.

Borman et al., "Block-matching Sub-pixel Motion Estimation from Noisy, Under-Sampled Frames—an Empirical Performance Evaluation," *SPIE Visual Comm. & Image Processing*, 10 pp. (1999).

Conklin et al., "Multi-resolution Motion Estimation," *Proc. ICASSP '97*, Munich, Germany, 4 pp. (1997).

Davis et al., "Equivalence of subpixel motion estimators based on optical flow and block matching," *Proc. IEEE Int'l Symposium on Computer Vision*, pp. 7-12 (1995).

de Haan et al., "Sub-pixel motion estimation with 3-D recursive search block-matching," *Signal Processing: Image Comm.* 6, pp. 229-239 (1994).

Ebrahimi, "MPEG-4 Video Verification Model Version 10.0," ISO/IEC JTC1/SC29/WG11, MPEG98/N1992, pp. 1, 43-52, 72-74, 123-130, and 190, document marked 1998.

Ericsson, "Fixed and Adaptive Predictors for Hybrid Predictive/Transform Coding," *IEEE Transactions on Comm.*, vol. COM-33, No. 12, pp. 1291-1302 (1985).

Flierl et al., "Multihypothesis Motion Estimation for Video Coding," *Proc. DCC*, 10 pp. (Mar. 2001).

Girod, "Efficiency Analysis of Multihypothesis Motion-Compensated Prediction for Video Coding," *IEEE Transactions on Image Processing*, vol. 9, No. 2, pp. 173-183 (Feb. 2000).

Girod, "Motion-Compensating Prediction with Fractional-Pel Accuracy," *IEEE Transactions on Comm.*, vol. 41, No. 4, pp. 604-612 (1993).

Girod, "Motion Compensation: Visual Aspects, Accuracy, and Fundamental Limits," *Motion Analysis and Image Sequence Processing*, Kluwer Academic Publishers, pp. 125-152 (1993).

Horn et al., "Estimation of Motion Vector Fields for Multiscale Motion Compensation," *Proc. Picture Coding Symp. (PCS 97)*, pp. 141-144 (Sep. 1997).

ITU—Q15-F-24, "MVC Video Codec—Proposal for H.26L," Study Group 16, Video Coding Experts Group (Question 15), 28 pp. (document marked as generated in 1998).

Iwahashi et al., "A Motion Compensation Technique for Downscaled Pictures in Layered Coding," *IEICE Transactions on Comm.*, vol. E77-B, No. 8, pp. 1007-1012 (Aug. 1994).

Keys, "Cubic Convolution Interpolation for Digital Image Processing," *IEEE Transactions on Acoustics, Speech & Signal Processing*, vol. ASSP-29, No. 6, pp. 1153-1160 (1981).

Konrad et al., "On Motion Modeling and Estimation for Very Low Bit Rate Video Coding," *Visual Comm. & Image Processing (VCIP '95)*, 12 pp. (May 1995).

Lopes et al., "Analysis of Spatial Transform Motion Estimation with Overlapped Compensation and Fractional-pixel Accuracy," *IEEE Proc. Visual Image Signal Processing*, vol. 146, No. 6, pp. 339-344 (Dec. 1999).

Microsoft Corp., "Microsoft Debuts New Windows Media Player 9 Series, Redefining Digital Media on the PC," 4 pp. (document marked Sep. 4, 2002) [Downloaded from the World Wide Web on May 14, 2004].

Morimoto et al., "Fast Electronic Digital Image Stabilization," *Proc. ICPR*, Vienna, Austria, 5 pp. (1996).

"Overview of MPEG-2 Test Model 5," 5 pp. [Downloaded from the World Wide Web on Mar. 1, 2006].

Reader, "History of MPEG Video Compression—Ver. 4.0," 99 pp., (document marked Dec. 16, 2003).

Ribas-Corbera et al., "On the Optimal Block Size for Block-based Motion-Compensated Video Coders," *SPIE Proc. of Visual Comm. & Image Processing*, vol. 3024, 12 pp. (1997).

Ribas-Corbera et al., "On the Optimal Motion Vector Accuracy for Block-based Motion-Compensated Video Coders," *Proc. SPIE Digital Video Compression*, San Jose, CA, 13 pp. (1996).

Schultz et al., "Subpixel Motion Estimation for Super-Resolution Image Sequence Enhancement," *Journal of Visual Comm. & Image Representation*, vol. 9, No. 1, pp. 38-50 (Mar. 1998).

"The TML Project WEB-Page and Archive" (including pages of code marked "image.cpp for H.26L decoder, Copyright 1999" and "image.c"), 24 pp. [Downloaded from the World Wide Web on Jun. 1, 2005].

Triggs, "Empirical Filter Estimation for Subpixel Interpolation and Matching," *Int'l Conf. Computer Vision '01*, Vancouver, Canada, 8 pp. (Jul. 2001).

Triggs, "Optimal Filters for Subpixel Interpolation and Matching," *Int'l Conf. Computer Vision '01*, Vancouver, Canada, 10 pp. (Jul. 2001).

"Video Coding Using Wavelet Decomposition for Very Low Bit-rate Networks," 16 pp. (1997).

Wang et al., "Interlace Coding Tools for H.26L Video Coding," ITU-T SG16/Q.6 VCEG-O37, pp. 1-20 (Dec. 2001).

Weiss et al., "Real Time Implementation of Subpixel Motion Estimation for Broadcast Applications," pp. Jul. 1-Jul. 3, 1990.

Wu et al., "Joint estimation of forward and backward motion vectors for interpolative prediction of video," *IEEE Transactions on Image Processing*, vol. 3, No. 5, pp. 684-687 (Sep. 1994).

Yang et al., "Very High Efficiency VLSI Chip-pair for Full Search Block Matching with Fractional Precision," *Proc. ICASSP/IEEE Int'l Conf. on Accoustics, Speech & Signal Processing*, Glasgow, pp. 2437-2440 (May 1989).

Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (1995).

Zhang et al., "Adaptive Field/Frame Selection for High Compression Coding," MERL TR-2003-29, 13 pp. (Jan. 2003).

Printouts of FTP directories from http://ftp3.itu.ch , 8 pp. (downloaded from the World Wide Web on Sep. 20, 2005.).

ISO/IEC, "Coding of Moving Pictures and Associated Audio Information," JTC1/SC29/WG11, MPEG-4 Video Verification Model (Feb. 1998).

"ITU-T Recommendation T.6: Facsimile Coding Schemes and Coding Control Functions for Group 4 Facsimile Apparatus," Facicle VII.3 of the Blue Book, (1988).

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video1," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Joint Video Team of ISO/IEC MPEG and ITU-T VCEG, "Committee Draft of Joint Video Specification (ITU-T Recommendation H.264, ISO/IEC 14496-10 AVC," 142 pp. (Aug. 2002).

* cited by examiner

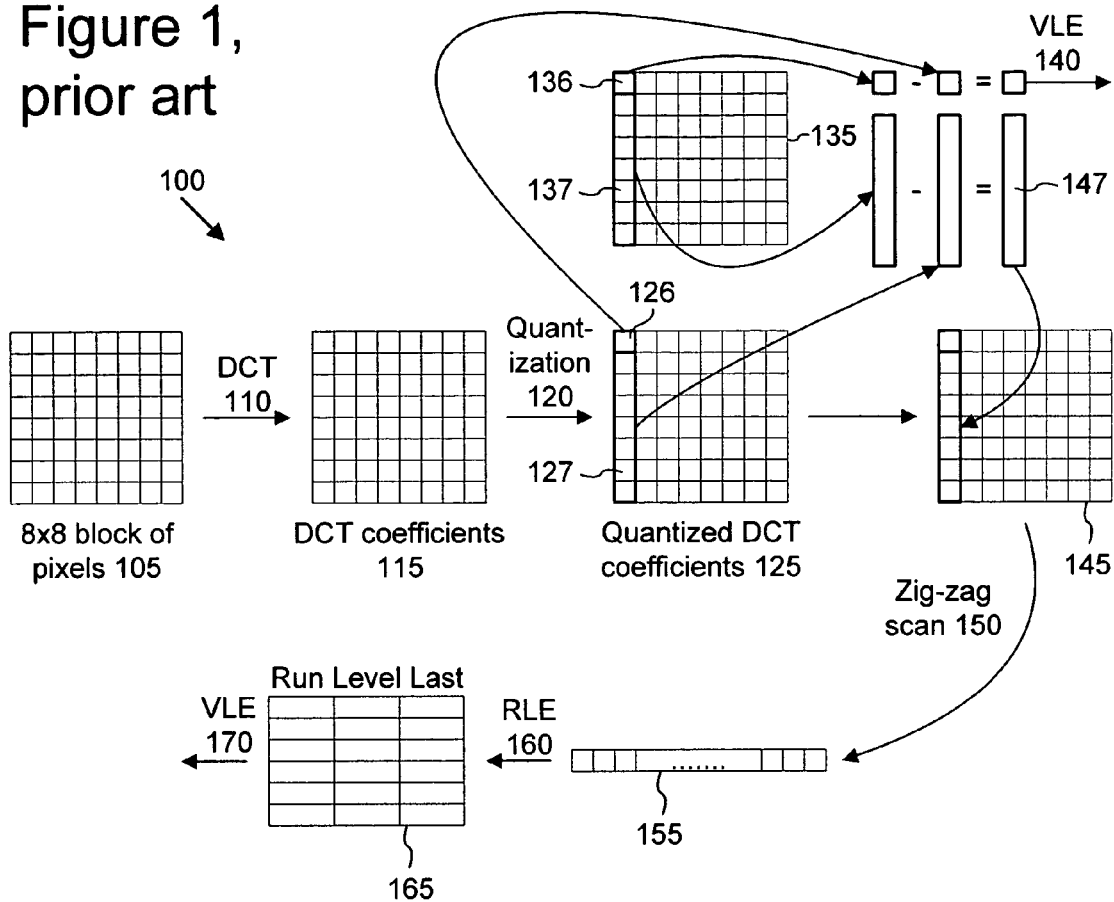
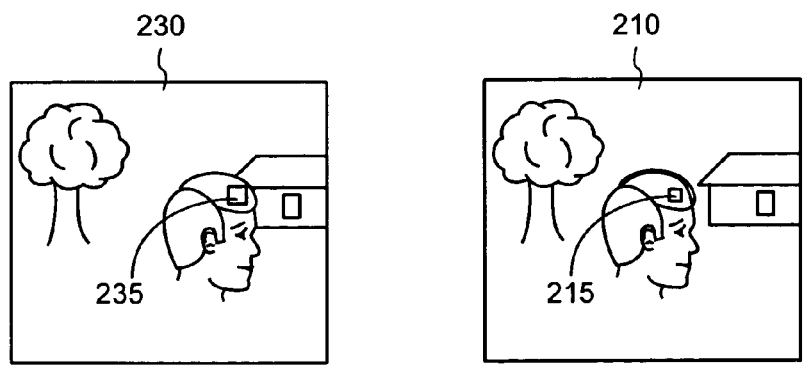

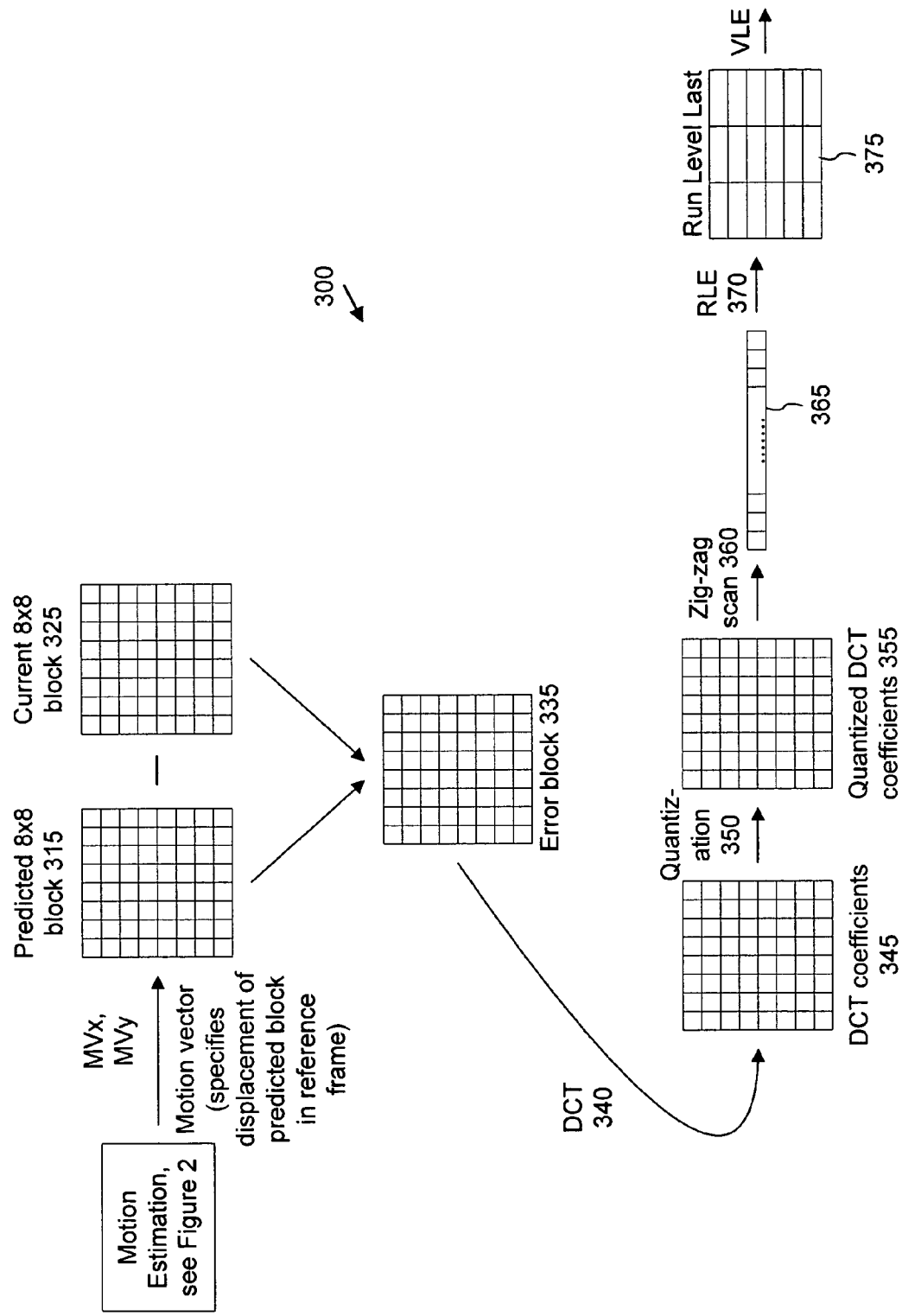
Figure 3, prior art

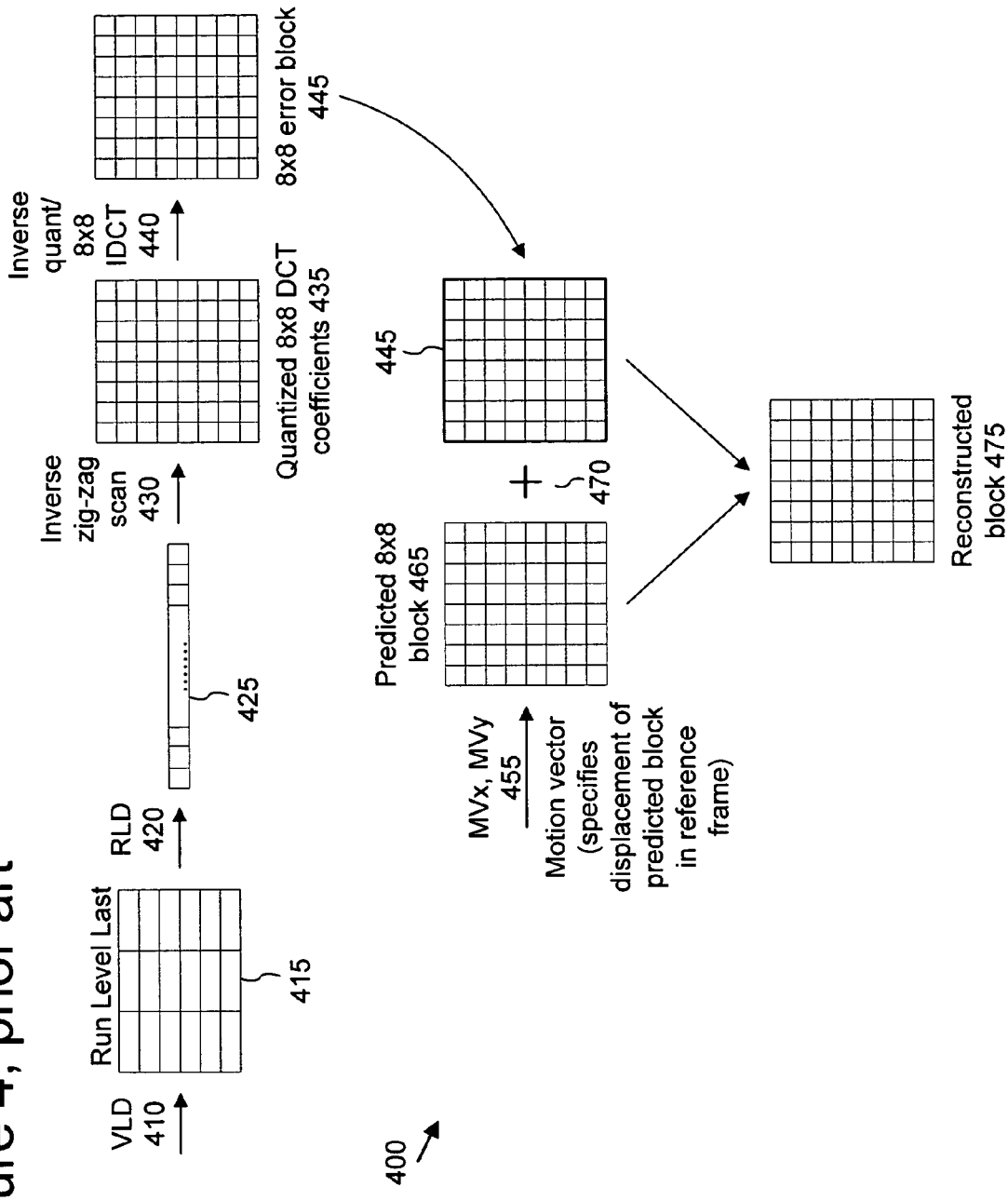
Figure 4, prior art

Figure 5, prior art
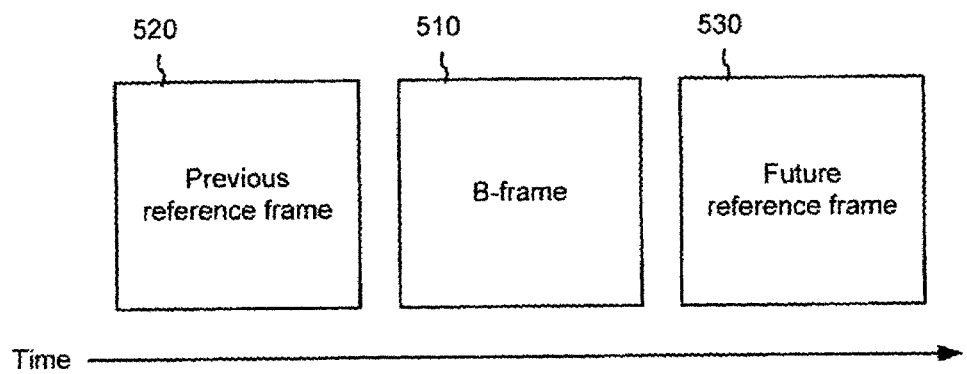
Figure 6, prior art
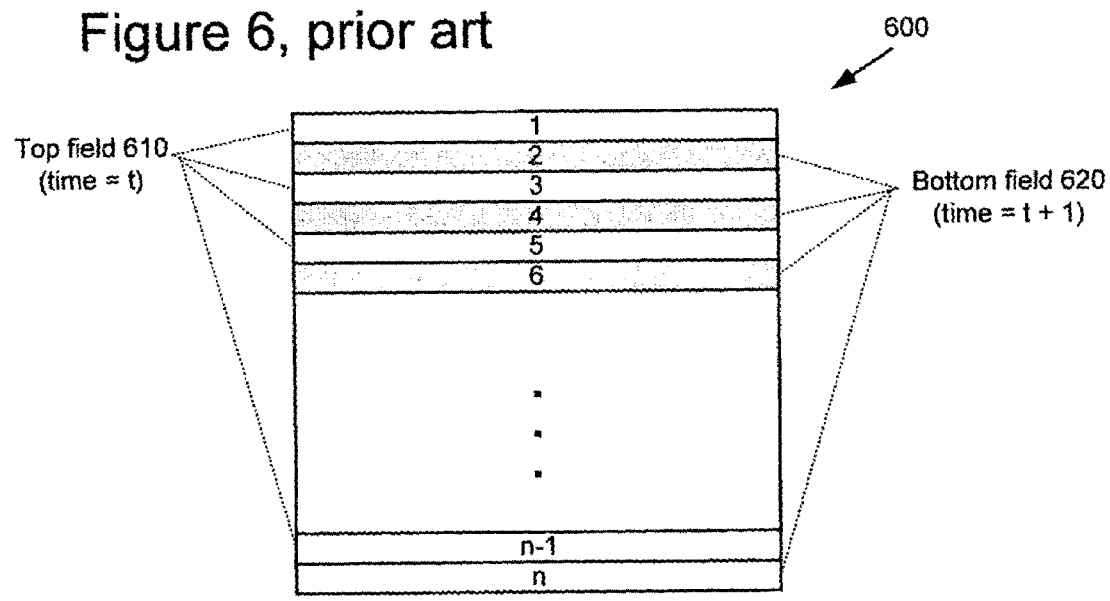

Software 780 implementing video encoder or decoder

| 1 |
|---|
| 2 |
| 3 |
| 4 |
| 5 |
| 6 |
| 7 |
| 8 |
| 9 |
| 10 |
| 11 |
| 12 |
| 13 |
| 14 |
| 15 |
| 16 |

U

| 1 |
|---|
| 2 |
| 3 |
| 4 |
| 5 |
| 6 |
| 7 |
| 8 |
| 9 |
| 10 |
| 11 |
| 12 |
| 13 |
| 14 |
| 15 |
| 16 |

V

| 1 |
|---|
| 2 |
| 3 |
| 4 |
| 5 |
| 6 |
| 7 |
| 8 |
| 9 |
| 10 |
| 11 |
| 12 |
| 13 |
| 14 |
| 15 |
| 16 |

Original MB

| 1 |
|---|
| 3 |
| 5 |
| 7 |
| 9 |
| 11 |
| 13 |
| 15 |
| 2 |
| 4 |
| 6 |
| 8 |
| 10 |
| 12 |
| 14 |
| 16 |

U

| 1 |
|---|
| 3 |
| 5 |
| 7 |
| 9 |
| 11 |
| 13 |
| 15 |
| 2 |
| 4 |
| 6 |
| 8 |
| 10 |
| 12 |
| 14 |
| 16 |

V

| 1 |
|---|
| 3 |
| 5 |
| 7 |
| 9 |
| 11 |
| 13 |
| 15 |
| 2 |
| 4 |
| 6 |
| 8 |
| 10 |
| 12 |
| 14 |
| 16 |

Field MB - Rearranged by field

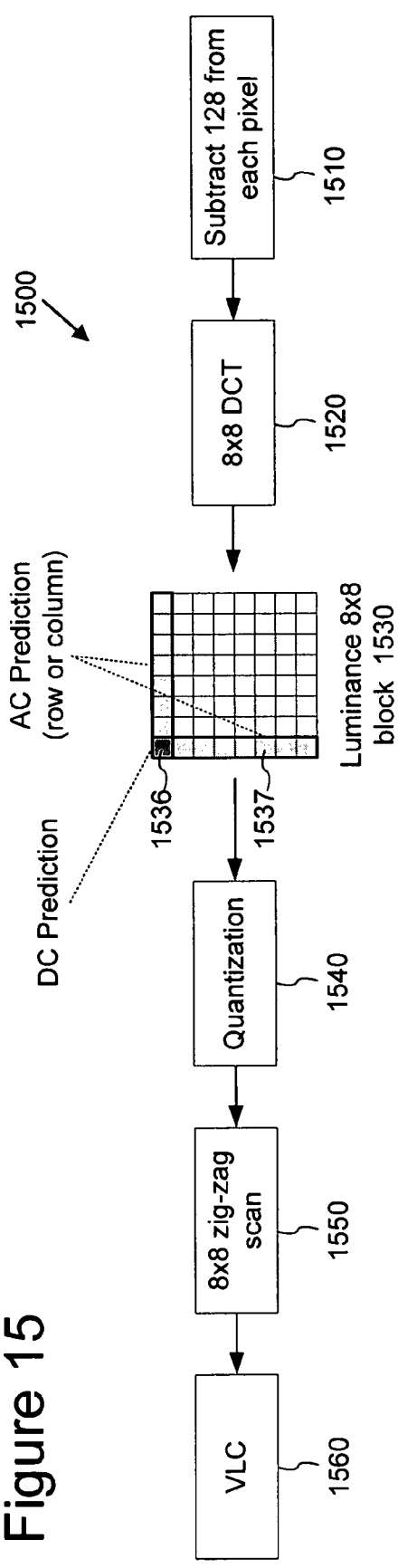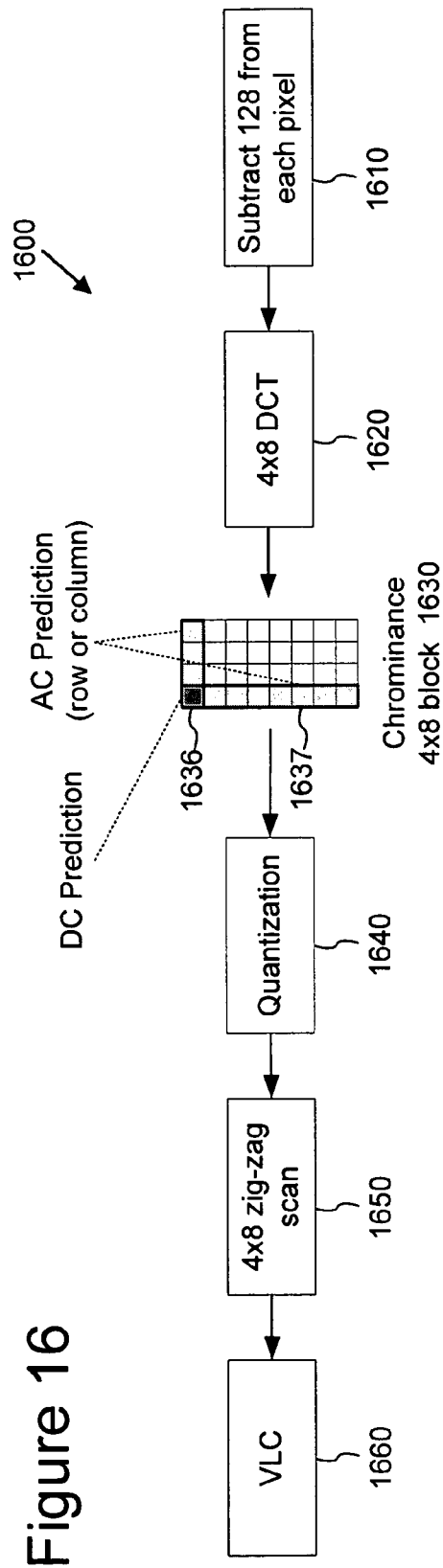

| Predictor A (If field coded, predictor is averaged) | Predictor B (If field coded, predictor is averaged) |
|---|---|
| Predictor C (If field coded, predictor is averaged) | Current frame macroblock 2010 |

| Predictor B (If field coded, predictor is averaged) | Predictor A (If field coded, predictor is averaged) |
|---|---|
| Predictor C (If field coded, predictor is averaged) | Current frame macroblock 2010 |

Figure 21A

| Top field predictor A | Top field predictor B |
|---|---|
| Bottom field predictor A | Bottom field predictor B |

| Top field predictor C | Current top field 2110 |
|---|---|
| Bottom field predictor C | Curr. bottom field 2120 |

Figure 21B

| Top field predictor B | Top field predictor A |
|---|---|
| Bottom field predictor B | Bottom field predictor A |
| Top field predictor C | Current top field 2110 |
| Bottom field predictor C | Curr. bottom field 2120 |

INTRAFRAME AND INTERFRAME INTERLACE CODING AND DECODING

RELATED APPLICATION INFORMATION

The following co-pending U.S. patent applications relate to the present application and are hereby incorporated herein by reference: 1) U.S. patent application Ser. No. 10/622,378, entitled, "Advanced Bi-Directional Predictive Coding of Video Frames," filed concurrently herewith; and 2) U.S. patent application Ser. No. 10/622,841, entitled, "Coding of Motion Vector Information," filed concurrently herewith.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

Techniques and tools for interlace coding and decoding in interframes and intraframes are described. For example, a video encoder encodes macroblocks in an interlaced video frame in a 4:1:1 format.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include intraframe compression and interframe compression. Intraframe compression techniques compress individual frames, typically called I-frames or key frames. Interframe compression techniques compress frames with reference to preceding and/or following frames, which are typically called predicted frames, P-frames, or B-frames.

Microsoft Corporation's Windows Media Video, Version 8 ["WMV8"] includes a video encoder and a video decoder. The WMV8 encoder uses intraframe and interframe compression, and the WMV8 decoder uses intraframe and interframe decompression.

A. Intraframe Compression in WMV8

FIG. 1 illustrates block-based intraframe compression 100 of a block 105 of pixels in a key frame in the WMV8 encoder. A block is a set of pixels, for example, an 8×8 arrangement of pixels. The WMV8 encoder splits a key video frame into 8×8 blocks of pixels and applies an 8×8 Discrete Cosine Transform ["DCT"] 110 to individual blocks such as the block 105. A DCT is a type of frequency transform that converts the 8×8 block of pixels (spatial information) into an 8×8 block of DCT coefficients 115, which are frequency information. The DCT operation itself is lossless or nearly lossless. Compared to the original pixel values, however, the DCT coefficients are more efficient for the encoder to compress since most of the significant information is concentrated in low frequency coefficients (conventionally, the upper left of the block 115) and many of the high frequency coefficients (conventionally, the lower right of the block 115) have values of zero or close to zero.

The encoder then quantizes 120 the DCT coefficients, resulting in an 8×8 block of quantized DCT coefficients 125. For example, the encoder applies a uniform, scalar quantization step size to each coefficient. Quantization is lossy. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients 125 for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient 126 as a differential from the DC coefficient 136 of a neighboring 8×8 block, which is a previously encoded neighbor (e.g., top or left) of the block being encoded. (FIG. 1 shows a neighbor block 135 that is situated to the left of the block being encoded in the frame.) The encoder entropy encodes 140 the differential.

The entropy encoder can encode the left column or top row of AC coefficients as a differential from a corresponding column or row of the neighboring 8×8 block. FIG. 1 shows the left column 127 of AC coefficients encoded as a differential 147 from the left column 137 of the neighboring (to the left) block 135. The differential coding increases the chance that the differential coefficients have zero values. The remaining AC coefficients are from the block 125 of quantized DCT coefficients.

The encoder scans 150 the 8×8 block 145 of predicted, quantized AC DCT coefficients into a one-dimensional array 155 and then entropy encodes the scanned AC coefficients using a variation of run length coding 160. The encoder selects an entropy code from one or more run/level/last tables 165 and outputs the entropy code.

B. Interframe Compression in WMV8

Interframe compression in the WMV8 encoder uses block-based motion compensated prediction coding followed by transform coding of the residual error. FIGS. 2 and 3 illustrate the block-based interframe compression for a predicted frame in the WMV8 encoder. In particular, FIG. 2 illustrates motion estimation for a predicted frame 210 and FIG. 3 illustrates compression of a prediction residual for a motion-estimated block of a predicted frame.

For example, the WMV8 encoder splits a predicted frame into 8×8 blocks of pixels. Groups of four 8×8 blocks form macroblocks. For each macroblocks, a motion estimation process is performed. The motion estimation approximates the motion of the macroblock of pixels relative to a reference frame, for example, a previously coded, preceding frame. In FIG. 2, the WMV8 encoder computes a motion vector for a macroblock 215 in the predicted frame 210. To compute the motion vector, the encoder searches in a search area 235 of a reference frame 230. Within the search area 235, the encoder compares the macroblock 215 from the predicted frame 210 to various candidate macroblocks in order to find a candidate macroblock that is a good match. After the encoder finds a good matching macroblock, the encoder outputs information specifying the motion vector (entropy coded) for the matching macroblock so the decoder can find the matching macroblock during decoding. When decoding the predicted frame 210 with motion compensation, a decoder uses the motion vector to compute a prediction macroblock for the macroblock 215 using information from the reference frame 230. The prediction for the macroblock 215 is rarely perfect, so the encoder usually encodes 8×8 blocks of pixel differences (also called the error or residual blocks) between the prediction macroblock and the macroblock 215 itself.

FIG. 3 illustrates an example of computation and encoding of an error block 335 in the WMV8 encoder. The error block 335 is the difference between the predicted block 315 and the original current block 325. The encoder applies a DCT 340 to the error block 335, resulting in an 8×8 block 345 of coefficients. The encoder then quantizes 350 the DCT coefficients, resulting in an 8×8 block of quantized DCT coefficients 355. The quantization step size is adjustable. Quantization results in loss of precision, but not complete loss of the information for the coefficients.

The encoder then prepares the 8×8 block 355 of quantized DCT coefficients for entropy encoding. The encoder scans 360 the 8×8 block 355 into a one dimensional array 365 with 64 elements, such that coefficients are generally ordered from lowest frequency to highest frequency, which typically creates long runs of zero values.

The encoder entropy encodes the scanned coefficients using a variation of run length coding 370. The encoder selects an entropy code from one or more run/level/last tables 375 and outputs the entropy code.

FIG. 4 shows an example of a corresponding decoding process 400 for an inter-coded block. Due to the quantization of the DCT coefficients, the reconstructed block 475 is not identical to the corresponding original block. The compression is lossy.

In summary of FIG. 4, a decoder decodes (410, 420) entropy-coded information representing a prediction residual using variable length decoding 410 with one or more run/level/last tables 415 and run length decoding 420. The decoder inverse scans 430 a one-dimensional array 425 storing the entropy-decoded information into a two-dimensional block 435. The decoder inverse quantizes and inverse discrete cosine transforms (together, 440) the data, resulting in a reconstructed error block 445. In a separate motion compensation path, the decoder computes a predicted block 465 using motion vector information 455 for displacement from a reference frame. The decoder combines 470 the predicted block 465 with the reconstructed error block 445 to form the reconstructed block 475.

The amount of change between the original and reconstructed frame is termed the distortion and the number of bits required to code the frame is termed the rate for the frame. The amount of distortion is roughly inversely proportional to the rate. In other words, coding a frame with fewer bits (greater compression) will result in greater distortion, and vice versa.

C. Bi-Directional Prediction

Bi-directionally coded images (e.g., B-frames) use two images from the source video as reference (or anchor) images. For example, referring to FIG. 5, a B-frame 510 in a video sequence has a temporally previous reference frame 520 and a temporally future reference frame 530.

Some conventional encoders use five prediction modes (forward, backward, direct, interpolated and intra) to predict regions in a current B-frame. In intra mode, an encoder does not predict a macroblock from either reference image, and therefore calculates no motion vectors for the macroblock. In forward and backward modes, an encoder predicts a macroblock using either the previous or future reference frame, and therefore calculates one motion vector for the macroblock. In direct and interpolated modes, an encoder predicts a macroblock in a current frame using both reference frames. In interpolated mode, the encoder explicitly calculates two motion vectors for the macroblock. In direct mode, the encoder derives implied motion vectors by scaling the co-located motion vector in the future reference frame, and therefore does not explicitly calculate any motion vectors for the macroblock.

D. Interlace Coding

A typical interlaced video frame consists of two fields scanned at different times. For example, referring to FIG. 6, an interlaced video frame 600 includes top field 610 and bottom field 620. Typically, the odd-numbered lines (top field) are scanned at one time (e.g., time t) and the even-numbered lines (bottom field) are scanned at a different (typically later) time (e.g., time t+1). This arrangement can create jagged tooth-like features in regions of a frame where motion is present because the two fields are scanned at different times. On the other hand, in stationary regions, image structures in the frame may be preserved (i.e., the interlace artifacts visible in motion regions may not be visible in stationary regions).

E. Standards for Video Compression and Decompression

Aside from WMV8, several international standards relate to video compression and decompression. These standards include the Motion Picture Experts Group ["MPEG"] 1, 2, and 4 standards and the H.261, H.262, and H.263 standards from the International Telecommunication Union ["ITU"]. Like WMV8, these standards use a combination of intraframe and interframe compression. The MPEG 4 standard describes coding of macroblocks in 4:2:0 format using, for example, frame DCT coding, where each luminance block is composed of lines from two fields alternately, and field DCT coding, where each luminance block is composed of lines from only one of two fields.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for encoding and decoding video images (e.g., interlaced frames). The various techniques and tools can be used in combination or independently.

In one aspect, macroblocks (e.g., in an interlaced video image) in a 4:1:1 format are processed. The 4:1:1 macroblocks comprise four 8×8 luminance blocks and four 4×8 chrominance blocks. The processing (e.g., video encoding or decoding) includes intra-frame and inter-frame processing.

The macroblocks can be frame-coded macroblocks, or field-coded macroblocks having a top field and a bottom field.

In another aspect, a video encoder classifies a macroblock in an interlaced video image as a field-coded macroblock with a top field and a bottom field. The encoder encodes the top field and the bottom field using either an intra-coding mode or an inter-coding mode for each field. The coding modes used for encoding the top and bottom fields are selected independently of one another.

In another aspect, a video encoder sends encoded blocks in field order for a first field (e.g., an inter-coded field) and a second field (e.g., an intra-coded field) in a field-coded macroblock. The acts of sending encoded blocks in field order facilitate encoding the first field and the second field independently from one another. Intra-coded fields can be encoded using DC/AC prediction.

In another aspect, a video decoder receives encoded blocks in field order for a first encoded field and a second encoded field in a field-coded macroblock, and decodes the encoded fields. Receiving encoded blocks in field order facilitates decoding the first and second encoded fields independently from one another.

In another aspect, a video decoder finds a DC differential for a current block in the intra-coded field, finds a DC predictor for the current block, and obtains a DC value for the current block by adding the DC predictor to the DC differential. The intra-coded field is decoded independently from the second field.

In another aspect, a video decoder finds a DC differential for a current block in an intra-coded field and selects a DC predictor from a group of candidate DC predictors. The group of candidate DC predictors comprises DC values from blocks (e.g., previously decoded blocks) adjacent to the current block (e.g., the top, top-left, or left adjacent blocks). A candidate DC predictor is considered missing if it is not intra-coded, or if it is outside a picture boundary. The selected DC predictor is a non-missing candidate DC predictor.

In another aspect, a video encoder performs DC prediction for a current block in an interlaced macroblock and selectively enables AC prediction blocks in the macroblock. When the AC prediction is enabled, AC coefficients can be selected for differential coding based on the selected DC predictor for the current block. AC prediction can be signaled in a bit stream (e.g., with flags indicating whether AC prediction is performed for all blocks in a frame macroblock, or whether AC prediction is performed for blocks in a field in a field macroblock).

In another aspect, a video encoder finds a motion vector for an inter-coded field in a macroblock and encodes the macroblock using the motion vector for the first field, where the second field in the macroblock is an intra-coded field.

In another aspect, a video encoder finds a motion vector predictor for predicting a motion vector for a first field from among a group of candidate predictors. The candidate predictors are motion vectors for neighboring macroblocks, and the motion vector predictor is a motion vector for one corresponding field in a neighboring field-coded macroblock comprising two fields. The encoder calculates a motion vector for the first field using the motion vector predictor, and encodes the macroblock using the calculated motion vector. For example, the first field is a top field, and the one corresponding field in the neighboring field-coded macroblock is a top field.

In another aspect, a 4:1:1 macroblock in an interlaced video image is processed (e.g., in an encoder or decoder) by finding a luminance motion vector for the macroblock and deriving a chrominance motion vector for the macroblock from the luminance motion vector. The deriving can include scaling down the luminance motion vector by a factor of four. The chrominance motion vector can be rounded (e.g., to quarter-pixel resolution) and can be pulled back if it references an out-of-frame region in a reference frame.

In another aspect, a video decoder decodes a motion vector for a current interlaced macroblock (e.g., a frame or field macroblock) and obtains a prediction macroblock for the current macroblock using the decoded motion vector. The obtaining includes performing bi-cubic interpolation to obtain sub-pixel displacement for the current macroblock.

In another aspect, a 4:1:1 macroblock in a bi-directionally predicted video image (e.g., an interlaced image) is processed. The macroblock can be frame-coded macroblock (having up to two associated motion vectors) or field-coded (having up to four associated motion vectors). Direct mode macroblocks can also be classified as frame-type or field-type macroblocks.

Additional features and advantages will be made apparent from the following detailed description of different embodiments that proceeds with reference to the accompanying drawings.

BRIEF DESCRIPTION OF THE DRAWINGS

FIG. 1 is a diagram showing block-based intraframe compression of an 8×8 block of pixels according to the prior art.

FIG. 2 is a diagram showing motion estimation in a video encoder according to the prior art.

FIG. 3 is a diagram showing block-based interframe compression for an 8×8 block of prediction residuals in a video encoder according to the prior art.

FIG. 4 is a diagram showing block-based interframe decompression for an 8×8 block of prediction residuals in a video encoder according to the prior art.

FIG. 5 is a diagram showing a B-frame with past and future reference frames according to the prior art.

FIG. 6 is a diagram showing an interlaced video frame according to the prior art.

FIG. 11 is a diagram showing an interlaced 4:1:1 macroblock.

FIG. 12 is a diagram showing an interlaced 4:1:1 macroblock rearranged according to a field structure.

FIG. 15 is a diagram showing a technique for encoding 8×8 luminance blocks in a 4:1:1 macroblock.

FIG. 16 is a diagram showing a technique for encoding 4×8 chrominance blocks in a 4:1:1 macroblock.

FIGS. 21A and 21B are diagrams showing predictors for finding one or more motion vectors for a field-coded macroblock.

DETAILED DESCRIPTION

The present application relates to techniques and tools for efficient compression and decompression of interlaced video. In various described embodiments, a video encoder and decoder incorporate techniques for encoding and decoding interlaced video frames, and signaling techniques for use in a bit stream format or syntax comprising different layers or levels (e.g., sequence level, frame/picture/image level, macroblock level, and/or block level).

The various techniques and tools can be used in combination or independently. Different embodiments implement one or more of the described techniques and tools.

I. Computing Environment

Figure 7:
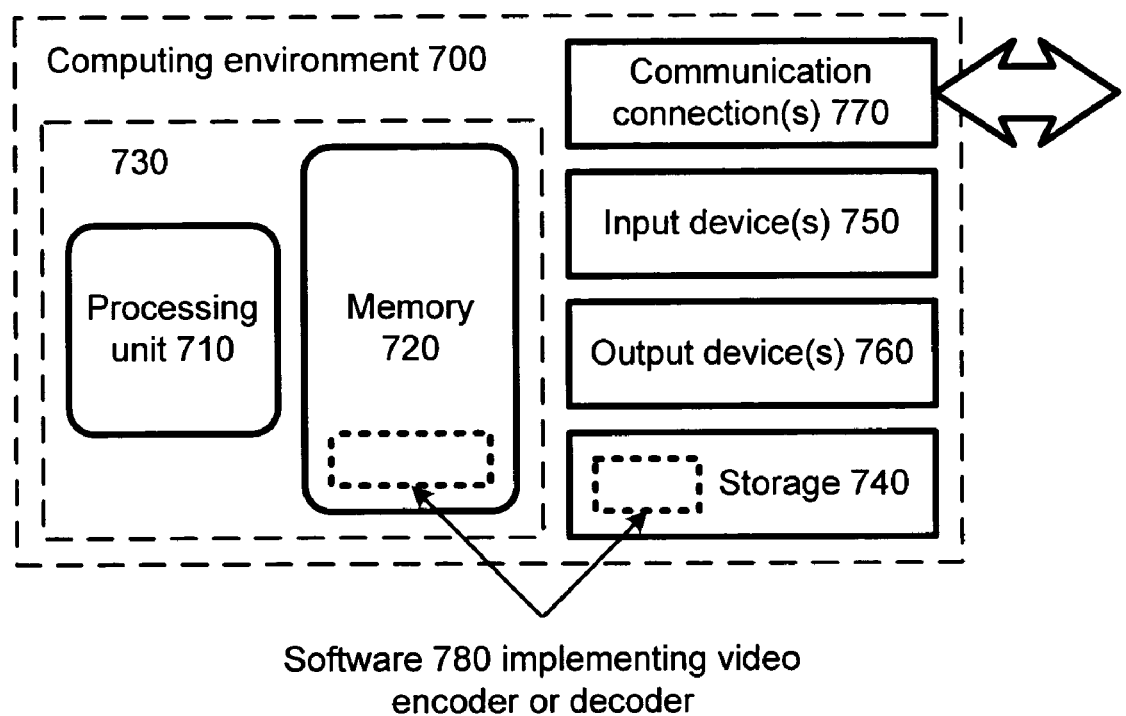
FIG. 7 is a block diagram of a suitable computing environment in which several described embodiments may be implemented.

FIG. 7 illustrates a generalized example of a suitable computing environment 700 in which several of the described embodiments may be implemented. The computing environment 700 is not intended to suggest any limitation as to scope of use or functionality, as the techniques and tools may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing a video encoder or decoder.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, DVDs, or any other medium which can be used to store information and which can be accessed within the computing environment 700. The storage 740 stores instructions for the software 780 implementing the video encoder or decoder.

The input device(s) 750 may be a touch input device such as a keyboard, mouse, pen, or trackball, a voice input device, a scanning device, or another device that provides input to the computing environment 700. For audio or video encoding, the input device(s) 750 may be a sound card, video card, TV tuner card, or similar device that accepts audio or video input in analog or digital form, or a CD-ROM or CD-RW that reads audio or video samples into the computing environment 700.

The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "indicate," "choose," "obtain," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 8:
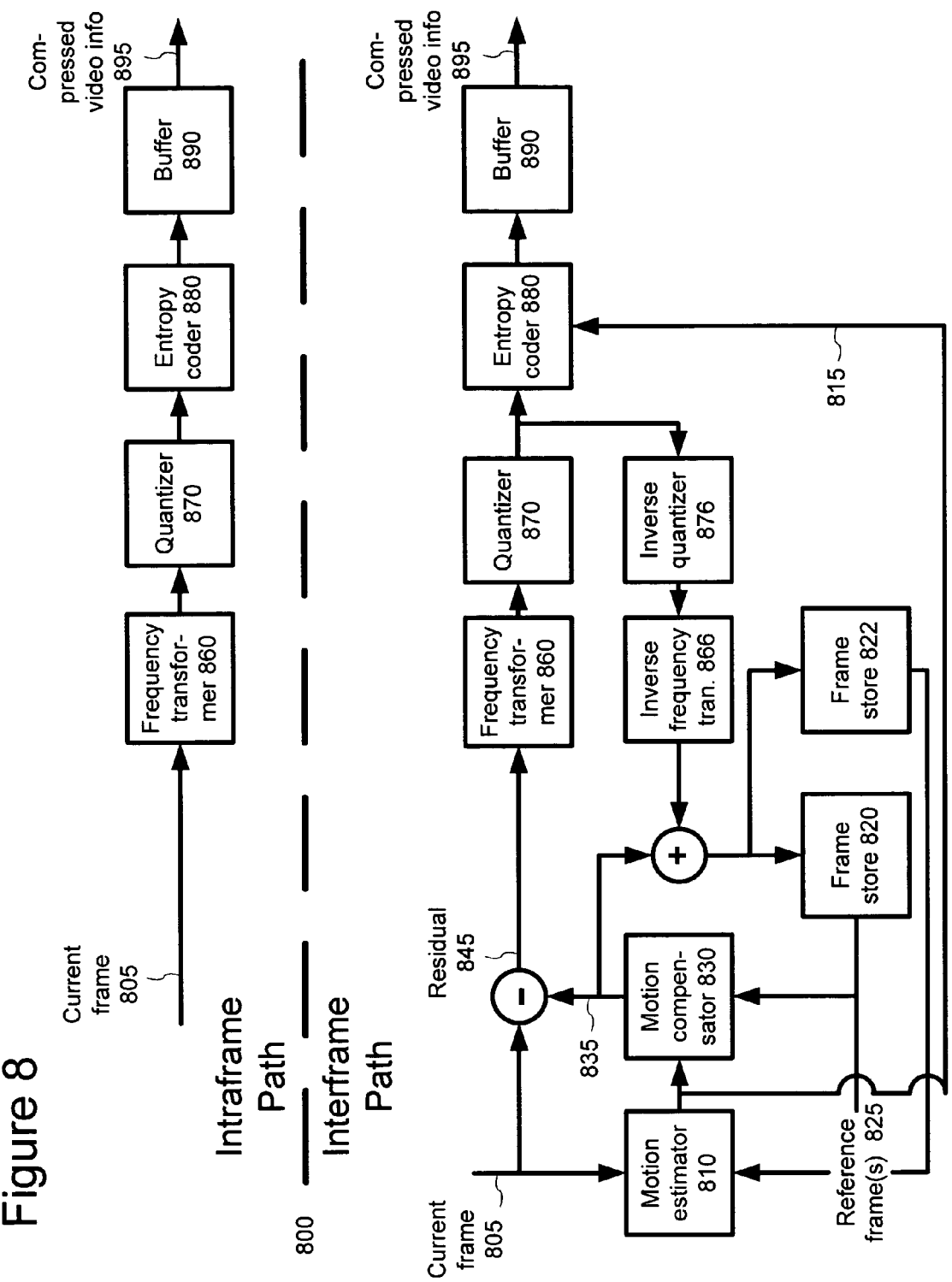
FIG. 8 is a block diagram of a generalized video encoder system used in several described embodiments.
Figure 9:
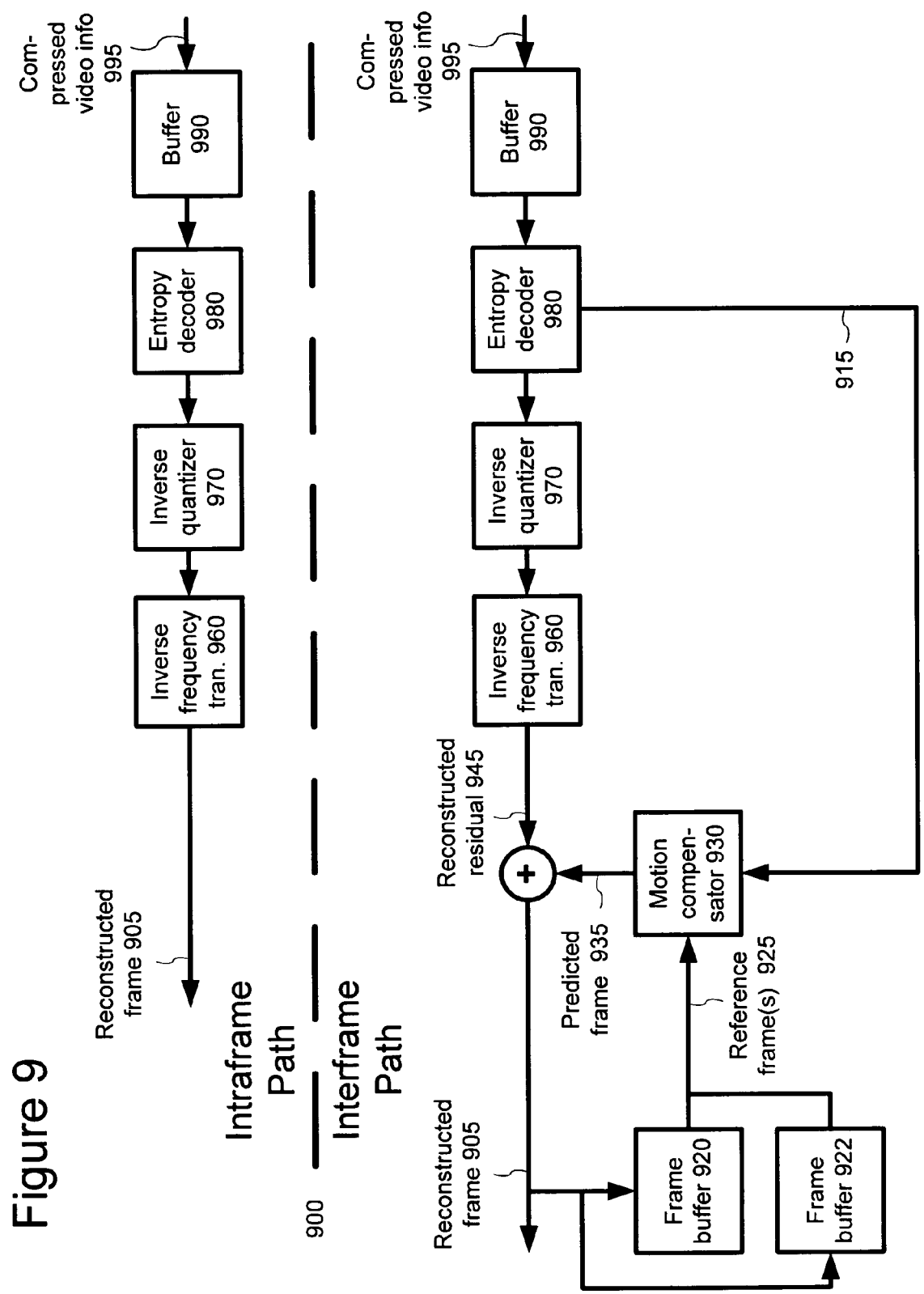
FIG. 9 is a block diagram of a generalized video decoder system used in several described embodiments.

FIG. 8 is a block diagram of a generalized video encoder 800 and FIG. 9 is a block diagram of a generalized video decoder 900.

The relationships shown between modules within the encoder and decoder indicate the main flow of information in the encoder and decoder; other relationships are not shown for the sake of simplicity. In particular, FIGS. 8 and 9 generally do not show side information indicating the encoder settings, modes, tables, etc. used for a video sequence, frame, macroblock, block, etc. Such side information is sent in the output bit stream, typically after entropy encoding of the side information. The format of the output bit stream can be a Windows Media Video format or another format.

The encoder 800 and decoder 900 are block-based and use a 4:1:1 macroblock format. Each macroblock includes four 8×8 luminance blocks and four 4×8 chrominance blocks. Further details regarding the 4:1:1 format are provided below. The encoder 800 and decoder 900 also can use a 4:2:0 macroblock format with each macroblock including four 8×8 luminance blocks (at times treated as one 16×16 macroblock) and two 8×8 chrominance blocks. Alternatively, the encoder 800 and decoder 900 are object-based, use a different macroblock or block format, or perform operations on sets of pixels of different size or configuration.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 8 is a block diagram of a general video encoder system 800. The encoder system 800 receives a sequence of video frames including a current frame 805, and produces compressed video information 895 as output. Particular embodiments of video encoders typically use a variation or supplemented version of the generalized encoder 800.

The encoder system 800 compresses predicted frames and key frames. For the sake of presentation, FIG. 8 shows a path for key frames through the encoder system 800 and a path for predicted frames. Many of the components of the encoder system 800 are used for compressing both key frames and predicted frames. The exact operations performed by those components can vary depending on the type of information being compressed.

A predicted frame (also called P-frame, B-frame, or inter-coded frame) is represented in terms of prediction (or difference) from one or more reference (or anchor) frames. A prediction residual is the difference between what was predicted and the original frame. In contrast, a key frame (also called l-frame, intra-coded frame) is compressed without reference to other frames.

If the current frame 805 is a forward-predicted frame, a motion estimator 810 estimates motion of ruacroblocks or other sets of pixels of the current frame 805 with respect to a reference frame, which is the reconstracted previous frame 825 buffered in a frame store (e.g., frame store 820). If the current frame 805 is a bi-directionally-predicted frame (a B-frame), a motion estimator 810 estimates motion in the current frame 805 with respect to two reconstructed reference frames. Typically, a motion estimator estimates motion in a B-frame with respect to a temporally previous reference frame and a temporally future reference frame. Accordingly, the encoder system 800 can comprise separate stores 820 and 822 Lot backward and forward reference frames. For more information on bi-directionally predicted frames, see U.S. patent application Ser. No. 10/622,378, entitled, "Advanced Bi-Directional Predictive Coding of Video Frames," filed concurrently herewith.

The motion estimator 810 can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator 810 outputs as side information motion information 815 such as motion vectors. A motion compensator 830 applies the motion information 815 to the reconstructed frame(s) 825 to form a motion-compensated current frame 835. The prediction is rarely perfect, however, and the difference between the motion-compensated current frame 835 and the original current frame 805 is the prediction residual 845. Alternatively, a motion estimator and motion compensator apply another type of motion estimation/compensation.

A frequency transformer 860 converts the spatial domain video information into frequency domain (i.e., spectral) data. For block-based video frames, the frequency transformer 860 applies a discrete cosine transform ["DCT"] or variant of DCT to blocks of the pixel data or prediction residual data, producing blocks of DCT coefficients. Alternatively, the frequency transformer 860 applies another conventional frequency transform such as a Fourier transform or uses wavelet or subband analysis. If the encoder uses spatial extrapolation (not shown in FIG. 8) to encode blocks of key frames, the frequency transformer 860 can apply a re-oriented frequency transform such as a skewed DCT to blocks of prediction residuals for the key frame. In some embodiments, the frequency transformer 860 applies an 8×8, 8×4, 4×8, or other size frequency transforms (e.g., DCT) to prediction residuals for predicted frames.

A quantizer 870 then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 800 can use frame dropping, adaptive filtering, or other techniques for rate control.

If a given macroblock in a predicted frame has no information of certain types (e.g., no motion information for the macroblock and no residual information), the encoder 800 may encode the macroblock as a skipped macroblock. If so, the encoder signals the skipped macroblock in the output bit stream of compressed video information 895.

When a reconstructed current frame is needed for subsequent motion estimation/compensation, an inverse quantizer 876 performs inverse quantization on the quantized spectral data coefficients. An inverse frequency transformer 866 then performs the inverse of the operations of the frequency transformer 860, producing a reconstructed prediction residual (for a predicted frame) or a reconstructed key frame. If the current frame 805 was a key frame, the reconstructed key frame is taken as the reconstructed current frame (not shown). If the current frame 805 was a predicted frame, the reconstructed prediction residual is added to the motion-compensated current frame 835 to form the reconstructed current frame. A frame store (e.g., frame store 820 ) buffers the reconstructed current frame for use in predicting another frame. In some embodiments, the encoder applies a deblocking filter to the reconstructed frame to adaptively smooth discontinuities in the blocks of the frame.

The entropy coder 880 compresses the output of the quantizer 870 as well as certain side information (e.g., motion information 815, spatial extrapolation modes, quantization step size). Typical entropy coding techniques include arithmetic coding, differential coding, Huffman coding, run length coding, LZ coding, dictionary coding, and combinations of the above. The entropy coder 880 typically uses different coding techniques for different kinds of information (e.g., DC coefficients, AC coefficients, different kinds of side information), and can choose from among multiple code tables within a particular coding technique.

The entropy coder 880 puts compressed video information 895 in the buffer 890. A buffer level indicator is fed back to bit rate adaptive modules.

The compressed video information 895 is depleted from the buffer 890 at a constant or relatively constant bit rate and stored for subsequent streaming at that bit rate. Therefore, the level of the buffer 890 is primarily a function of the entropy of the filtered, quantized video information, which affects the efficiency of the entropy coding. Alternatively, the encoder system 800 streams compressed video information immediately following compression, and the level of the buffer 890 also depends on the rate at which information is depleted from the buffer 890 for transmission.

Before or after the buffer 890, the compressed video information 895 can be channel coded for transmission over the network. The channel coding can apply error detection and correction data to the compressed video information 895.

B. Video Decoder

FIG. 9 is a block diagram of a general video decoder system 900. The decoder system 900 receives information 995 for a compressed sequence of video frames and produces output including a reconstructed frame 905. Particular embodiments of video decoders typically use a variation or supplemented version of the generalized decoder 900.

The decoder system 900 decompresses predicted frames and key frames. For the sake of presentation, FIG. 9 shows a path for key frames through the decoder system 900 and a path for predicted frames. Many of the components of the decoder system 900 are used for decompressing both key frames and predicted frames. The exact operations performed by those components can vary depending on the type of information being decompressed.

A buffer 990 receives the information 995 for the compressed video sequence and makes the received information available to the entropy decoder 980. The buffer 990 typically receives the information at a rate that is fairly constant over time, and includes a jitter buffer to smooth short-term variations in bandwidth or transmission. The buffer 990 can include a playback buffer and other buffers as well. Alternatively, the buffer 990 receives information at a varying rate. Before or after the buffer 990, the compressed video information can be channel decoded and processed for error detection and correction.

The entropy decoder 980 entropy decodes entropy-coded quantized data as well as entropy-coded side information (e.g., motion information 915, spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 980 frequently uses different decoding techniques for different kinds of information (e.g., DC coefficients, AC coefficients, different kinds of side information), and can choose from among multiple code tables within a particular decoding technique.

A motion compensator 930 applies motion information 915 to one or more reference frames 925 to form a prediction 935 of the frame 905 being reconstructed. For example, the motion compensator 930 uses a macroblock motion vector to find a macroblock in a reference frame 925. A frame buffer (e.g., frame buffer 920) stores previously reconstructed frames for use as reference frames. Typically, B-frames have more than one reference frame (e.g., a temporally previous reference frame and a temporally future reference frame). Accordingly, the decoder system 900 can comprise separate frame buffers 920 and 922 for backward and forward reference frames.

The motion compensator 930 can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder 900 also reconstructs prediction residuals.

When the decoder needs a reconstructed frame for subsequent motion compensation, a frame buffer (e.g., frame buffer 920) buffers the reconstructed frame for use in predicting another frame. In some embodiments, the decoder applies a deblocking filter to the reconstructed frame to adaptively smooth discontinuities in the blocks of the frame.

An inverse quantizer 970 inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer 960 converts the quantized, frequency domain data into spatial domain video information. For block-based video frames, the inverse frequency transformer 960 applies an inverse DCT ["IDCT"] or variant of IDCT to blocks of the DCT coefficients, producing pixel data or prediction residual data for key frames or predicted frames, respectively. Alternatively, the frequency transformer 960 applies another conventional inverse frequency transform such as a Fourier transform or uses wavelet or subband synthesis. If the decoder uses spatial extrapolation (not shown in FIG. 9) to decode blocks of key frames, the inverse frequency transformer 960 can apply a re-oriented inverse frequency transform such as a skewed IDCT to blocks of prediction residuals for the key frame. In some embodiments, the inverse frequency transformer 960 applies an 8×8, 8×4, 4×8, or other size inverse frequency transforms (e.g., IDCT) to prediction residuals for predicted frames.

When a skipped macroblock is signaled in the bit stream of information 995 for a compressed sequence of video frames, the decoder 900 reconstructs the skipped macroblock without using the information (e.g., motion information and/or residual information) normally included in the bit stream for non-skipped macroblocks.

III. Interlace Coding

Interlaced content (such as the interlaced content prevalent in the television industry) is an important consideration in video encoding and decoding applications. Accordingly, described embodiments include techniques and tools for efficient compression and decompression of interlaced video.

As explained above, a typical interlaced video frame consists of two fields (e.g., a top field and a bottom field) scanned at different times. Described embodiments exploit this property and perform efficient compression by selectively compressing different regions of the image using different techniques. Typically, it is more efficient to encode stationary regions as a whole (frame coding). On the other hand, it is often more efficient to code moving regions by fields (field coding). Therefore, in described embodiments, macroblocks in an image can be encoded either as frame macroblocks or field macroblocks. Frame macroblocks are typically more suitable for stationary regions. Field macroblocks are typically more suitable for moving regions because the two fields in the macroblock tend to have different motion, and each field tends to have a higher correlation with itself than with the other field. Some described embodiments focus on field macroblock encoding for both intra-coded frames and inter-coded frames.

The features of the described embodiments include:

1) A 4:1:1 YUV macroblock format for interframe and intraframe compression and decompression.

2) Inter-coding or intra-coding a field within a macroblock, independent of whether the other field within the macroblock was inter-coded or intra-coded.
3) A DC/AC prediction scheme that facilitates encoding fields independently of each other.
4) Motion vector prediction techniques for interlaced frames, including using motion vectors from neighboring fields separately to predict a motion vector for a current field, rather than averaging them.
5) A scheme for deriving chrominance motion vectors from luminance motion vectors.

A. 4:1:1 Macroblock Format

Figure 10:
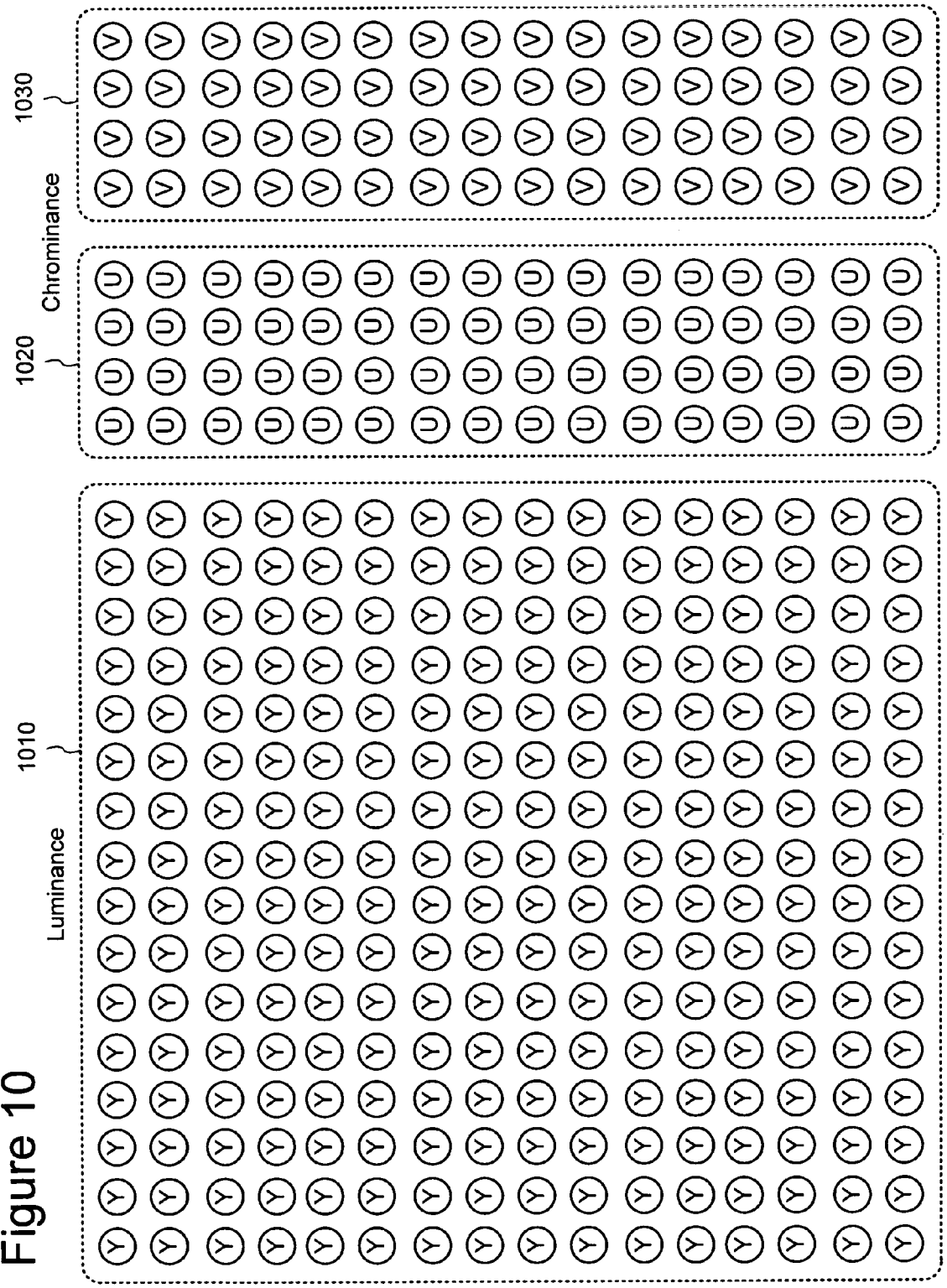
FIG. 10 is a diagram showing luminance and chrominance samples in a 4:1:1 macroblock.

In some embodiments, a video encoder/decoder processes macroblocks in a 4:1:1 macroblock format. FIG. 10 shows a 4:1:1 format for a macroblock. A 4:1:1 macroblock consists of a luminance matrix 1010 and two chrominance matrices 1020 and 1030. Relative to the luminance matrix, the chrominance matrices are sub-sampled by a factor of four in the horizontal dimension, but are at full resolution in the vertical dimension.

The 4:1:1 format differs from the 4:2:0 format in the arrangement of the chrominance samples. Both 4:1:1 and 4:2:0 macroblocks have four 8×8 luminance blocks. A 4:2:0 macroblock has two 8×8 chrominance blocks, one for each of the U and V channels. The U and V channels are therefore sub-sampled by a factor of two in both the vertical and horizontal dimensions. However, a 4:1:1 macroblock has four 4×16 chrominance blocks, two for each of the U and V channels. The 4:1:1 format preserves the field structure in the chrominance domain and has a better chrominance sub-sampling ratio, which results in accurate reconstruction of moving color regions in interlaced video.

Macroblocks in interlaced frames can be classified as frame macroblocks or field macroblocks. FIG. 11 shows an original macroblock 1100 in 4:1:1 format. The original macroblock 1100 is composed of eight top field lines (odd-numbered lines 1, 3, 5, 7, 9, 11, 13 and 15) and eight bottom field lines (even-numbered lines 2, 4, 6, 8, 10, 12, 14 and 16). A frame macroblock has a layout identical to the original macroblock 1100. FIG. 12 shows a field macroblock 1200. Field macroblock 1200 is rearranged relative to the original macroblock 1100, with the top field lines together in the top half and the bottom field lines together in the bottom half of the macroblock 1200.

As explained above, in interlaced frames, the top field lines and the bottom field lines are scanned at different times. Referring again to FIG. 11, if the original macroblock 1100 contains fast moving objects, then the correlation among lines of the same field tends to be stronger than the correlation among lines of different fields (e.g., motion in line 1 has a stronger correlation with line 3 than with line 2, even though line 2 is closer to line 1 spatially). On the other hand, if the original macroblock 1100 contains mostly stationary objects, then the correlation among lines of different fields tends to be stronger than the correlation among lines of the same field (e.g., line 1 has a stronger correlation with line 2 than with line 3.) This is the reasoning behind classifying macroblocks as frame type or field type. For example, an encoder can select frame type for stationary to low-motion macroblocks and field type for high-motion macroblocks.

Figure 13:
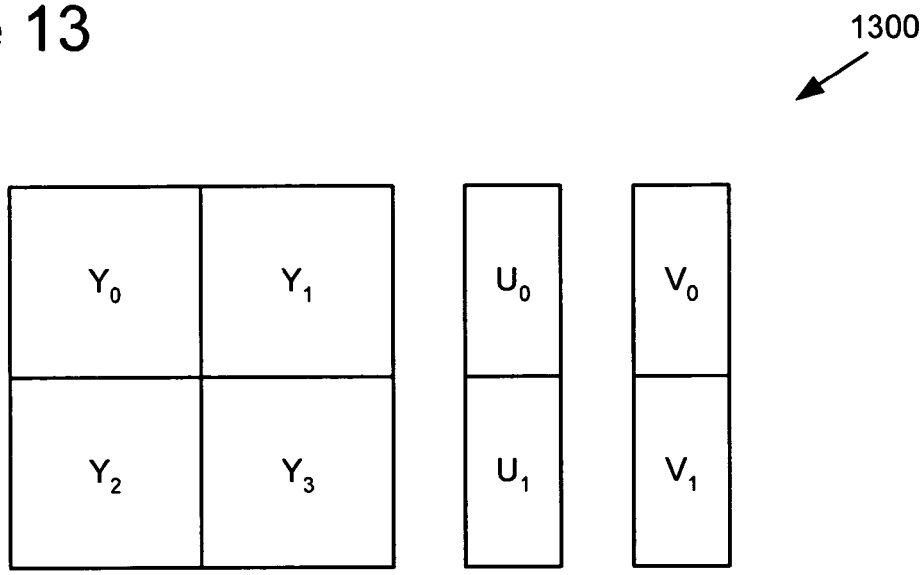
FIG. 13 is a diagram showing an interlaced 4:1:1 macroblock subdivided into four 8×8 Y blocks, two 4×8 U blocks, and two 4×8 V blocks.

After a 4:1:1 macroblock is classified as a frame macroblock or a field macroblock, it is subdivided into blocks. For example, FIG. 13 shows a macroblock 1300 subdivided into four 8×8 Y blocks ($Y_0, Y_1, Y_2, Y_3$), two 4×8 U ($U_0, U_1$) blocks and two 4×8 V ($V_0, V_1$) blocks. For a field macroblock, the top field comprises only blocks $Y_0, Y_1, U_0, V_0$, and the bottom field comprises only blocks $Y_2, Y_3, U_1, V_1$.

B. Independent Coding of Macroblock Fields

In some embodiments, one field in a field-coded macroblock is capable of being inter-coded or intra-coded regardless of how the other field in the macroblock was encoded. This allows the macroblock to contain one inter-coded field and one intra-coded field, rather than being restricted to being entirely intra-coded or inter-coded. This flexibility is helpful, for example, in scene transitions where the two fields of an interlaced frame are from different scenes. One field (e.g., a field in a macroblock corresponding to a newly introduced scene) can be intra-coded while the other field (e.g., a field corresponding to a previous scene) can be inter-coded (i.e., predicted from other frames).

Figure 14:
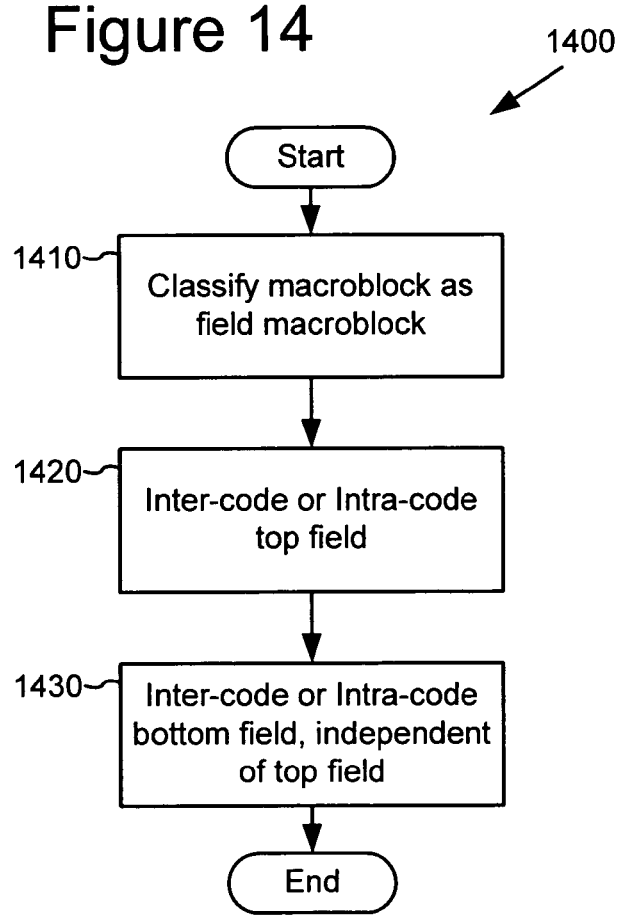
FIG. 14 is a flow chart showing a technique for encoding fields in a field macroblock independently from one another.

For example, FIG. 14 shows a technique 1400 for encoding fields in a field macroblock independently from one another. First, at 1410, an encoder classifies a macroblock as a field macroblock. Then, at 1420, the encoder encodes the top field in the macroblock using either intra-coding or inter-coding. At 1430, the encoder then encodes the bottom field using either intra-coding or inter-coding, regardless of whether the top field was intra-coded or inter-coded. Referring again to FIG. 13, for a frame macroblock, the encoder sends the blocks in the following order: $Y_0, Y_1, Y_2, Y_3, U_0, U_1, V_0, V_1$. For a field macroblock, the encoder sends the blocks in field order: $Y_0, Y_1, U_0, V_0$ (top field) and $Y_2, Y_3, U_1, V_1$ (bottom field). For field macroblocks, the encoder sends the blocks in field order to allow intra- and inter-coded fields to exist within the same macroblock.

Finer encoding granularity (in terms of allowing for different kinds of motion in different fields) can be achieved when fields can be encoded independently from one another. To help achieve this finer granularity, some embodiments employ DC/AC prediction techniques for encoding an intra field independently from the other field in the macroblock.

1. DC/AC Prediction

In some embodiments, DC/AC prediction techniques facilitate the co-existence of inter- and intra-coded fields in the same macroblock. FIGS. 15 and 16 show exemplary techniques 1500 and 1600 for encoding macroblocks using DC/AC prediction techniques.

For example, when coding an interlaced video frame, an encoder encodes 4:1:1 macroblocks (which have been classified as either field macroblocks or frame macroblocks) in raster scan order from left to right. Referring again to FIG. 13, a macroblock 1300 is subdivided into four 8×8 Y blocks ($Y_0, Y_1, Y_2, Y_3$), two 4×8 U ($U_0, U_1$) blocks and two 4×8 V ($V_0, V_1$) blocks. For a field macroblock, the top field comprises only blocks $Y_0, Y_1, U_0, V_0$, and the bottom field comprises only blocks $Y_2, Y_3, U_1, V_1$. An encoder encodes the blocks in different ways depending on, for example, whether a macroblock is a field or frame macroblock, and whether the block within the macroblock is a chrominance or luminance block.

FIG. 15 shows a technique 1500 for encoding 8×8 luminance blocks (e.g., blocks $Y_0, Y_1, Y_2$, and $Y_3$ (FIG. 13)). The encoder forms residual blocks for the luminance blocks. In some embodiments, the encoder forms residual blocks by subtracting an expected average pixel value from each pixel in the luminance blocks. For example, at 1510, the encoder subtracts 128 from each pixel (e.g., where the color depth ranges from 0 to 255) to form residual blocks. The encoder applies an 8×8 DCT 1520 to the residual blocks. The encoder performs DC/AC prediction along the row or the column of the residual blocks (e.g., residual 8×8 luminance block 1530). After DC/AC prediction, the encoder performs quantization 1540 on the coefficients, performs an 8×8 zig-zag scan 1550, and performs variable-length coding 1560 of the results.

FIG. 16 shows a similar technique 1600 for encoding 4×8 chrominance blocks (e.g., blocks $U_0$, $U_1$, $V_0$, and $V_1$ (FIG. 13)). The encoder forms residual blocks for the chrominance blocks (e.g., by subtracting 1610 a value of 128 from each pixel). The encoder applies a 4×8 DCT 1620 to the residual blocks. The encoder performs DC/AC prediction along the row or the column of the residual blocks (e.g., residual 4×8 chrominance block 1630). After DC/AC prediction, the encoder performs quantization 1640 on the coefficients, performs a 4×8 zig-zag scan 1650, and performs variable-length coding 1660 of the results.

For both the luminance and chrominance blocks, the encoder encodes DC coefficients differentially using the DC coefficients of neighboring blocks as predictors. While DC coefficients are always encoded differentially using neighboring blocks as predictors in these techniques, the encoder determines during encoding whether to predictively encode AC coefficients, and signals predictive AC coefficient encoding using flags (e.g., the ACPREDMB, ACPREDTFIELD, and/or ACPREDBFIELD flags described below). For a chrominance block, if row AC prediction is chosen, then the four coefficients of the first row are differentially coded.

Figure 17:
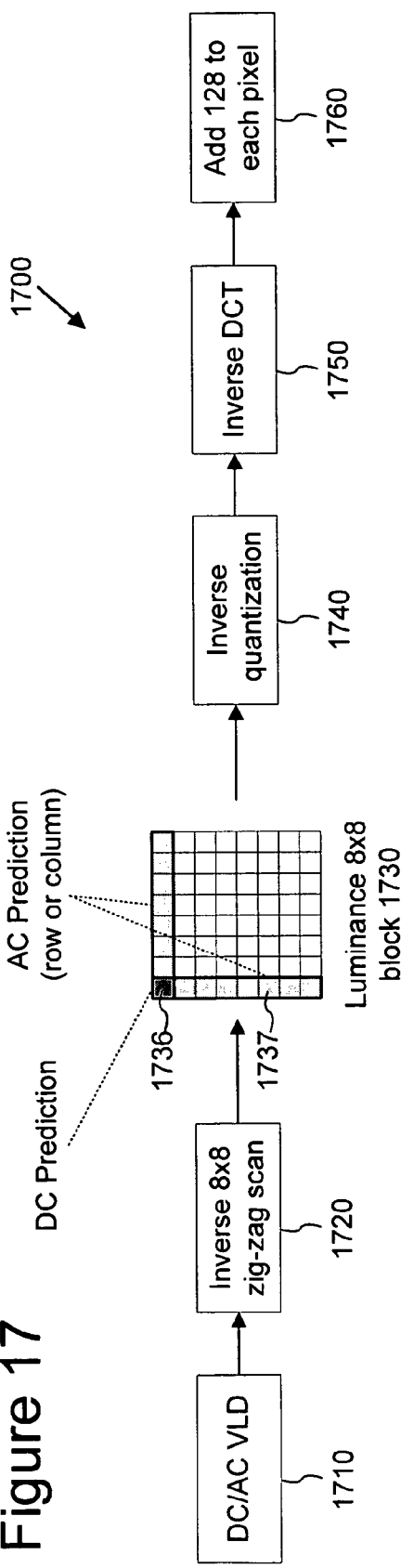
FIG. 17 is a diagram showing a technique for decoding 8×8 luminance blocks in a 4:1:1 macroblock.
Figure 18:
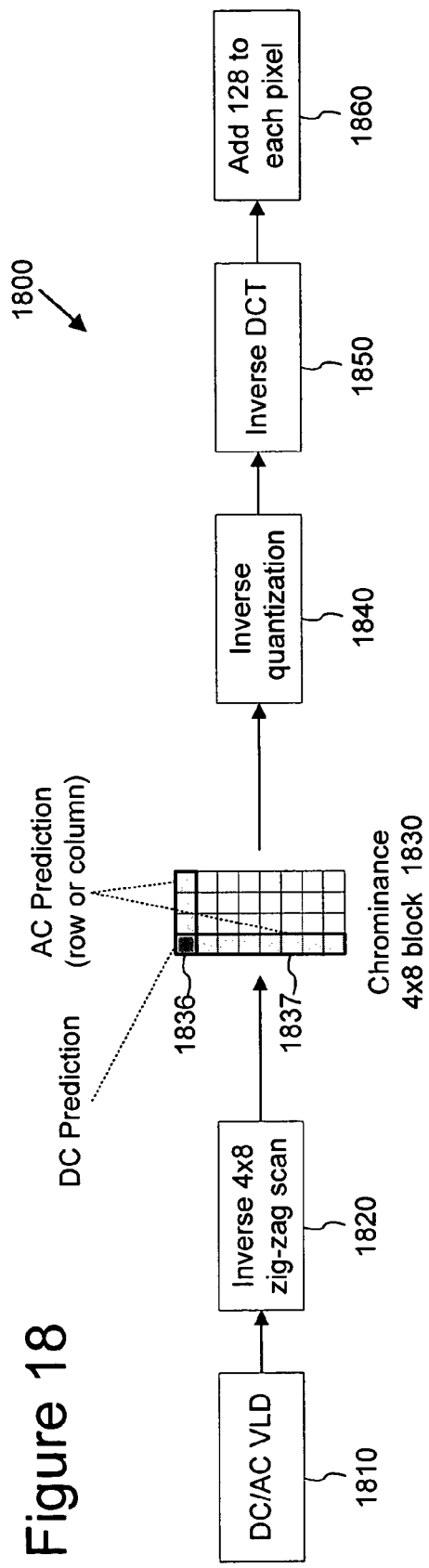
FIG. 18 is a diagram showing a technique for decoding 4×8 chrominance blocks in a 4:1:1 macroblock.

FIGS. 17 and 18 show techniques 1700 and 1800 for decoding chrominance blocks and luminance blocks in 4:1:1 macroblocks. In FIG. 17, at 1710, a decoder decodes variable length codes representing DC and AC coefficients in 8×8 luminance blocks. The decoder performs an inverse 8×8 zig-zag scan 1720 and performs DC/AC prediction for 8×8 luminance blocks (e.g., luminance block 1730). The decoder's completion of DC/AC prediction results in reconstructed, quantized, DCT luminance coefficient blocks. To complete the decoding, the decoder performs inverse quantization 1740 and an inverse DCT 1750 on the coefficients and adds 128 (at 1760) to each pixel.

In FIG. 18, at 1810, a decoder decodes variable length codes representing DC and AC coefficients in 4×8 chrominance blocks. The decoder performs an inverse 4×8 zig-zag scan 1820 and performs DC/AC prediction for 4×8 chrominance blocks (e.g., chrominance block 1830). The decoder's completion of DC/AC prediction results in reconstructed, quantized, DCT chrominance coefficient blocks. To complete the decoding, the decoder performs inverse quantization 1840 and an inverse DCT 1850 on the coefficients and adds 128 (at 1860) to each pixel.

a. DC Prediction

Figures 19, 20A, 20B:
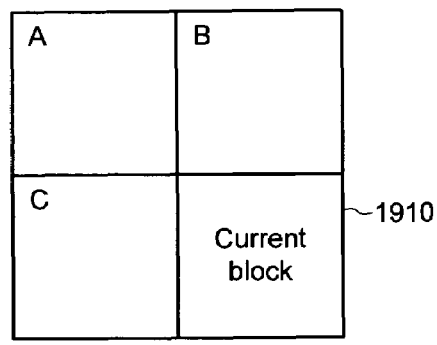
FIG. 19 is a diagram showing predictors for finding a DC coefficient for a current block.
FIGS. 20A and 20B are diagrams showing predictors for finding a motion vector for a frame-coded macroblock.

In DC/AC prediction, the quantized DC value for the current block is obtained by adding the DC predictor to the DC differential. The DC predictor is obtained from one of the previously decoded adjacent blocks. For example, FIG. 19 shows the current block 1910 and adjacent candidate predictor blocks. The values A, B and C in the adjacent candidate predictor blocks represent the quantized DC values (prior to the addition of 128) for the top-left, top and left adjacent blocks respectively.

In some cases, one or more of the adjacent candidate predictor blocks with values A, B, and C are considered missing. For example, a candidate predictor block is considered missing if it is outside the picture boundary. Or, when finding a predictor for a current intra block in an interlaced inter-frame (e.g., an interlaced P-frame), the candidate predictor block is considered missing if it is not intra-coded. Only values from non-missing predictor blocks are used for DC prediction.

In some embodiments, if all three candidate blocks are present, the encoder/decoder selects the predictor value based on the following rule:

```
If ( | B - A | < | C - A | ) {
    Predictor value = C
} else {
    Predictor value = A
}
```

If an adjacent candidate block is missing, then the following rules apply:
  If block C is missing and block B is not, then choose B as the predictor.
  If block B is missing and block C is not, then choose C as the predictor.
  If both B and C are missing, then no predictor is used.
  If A is missing, and B and C are present, then choose B if the DC predictor for block C is smaller than the DC predictor for block B, otherwise, choose block C.

Alternatively, an encoder/decoder uses other rules for choosing DC predictors.

b. AC Prediction

If AC prediction is enabled for the current block, then the AC coefficients on either the top row or the left column of the current block may be differentially encoded. This decision is based on the DC predictor. For example, in some embodiments, AC prediction proceeds according to the following rules:
  If the DC predictor is the top block, then the AC coefficients on the top row of the current block are differentially coded.
  If the DC predictor is the left block, then the AC coefficients on the left column of the current block are differentially coded.
  If no DC predictor is used, then the AC coefficients are not differentially coded.

Alternatively, an encoder/decoder uses other rules for AC prediction.

The AC coefficients in a predicted row or column are added to the corresponding decoded AC coefficients (prior to adding 128) in the current block to produce a reconstructed, quantized, DCT coefficient block.

2. Signaling for DC/AC Prediction

In some embodiments, an encoder/decoder uses signals in a bit stream at macroblock level to indicate whether AC prediction is active for a macroblock or for individual fields in a macroblock. For example, for frame macroblocks, an encoder indicates whether AC prediction will be performed for all blocks in the macroblock with the one-bit flag ACPREDMB. For field macroblocks, the encoder uses two one-bit flags to independently indicate whether AC prediction will be performed for blocks in the top field (ACPREDTFIELD) and bottom field (ACPREDBFIELD). Specifically, referring again to FIG. 13, ACPREDMB indicates whether AC prediction is used for blocks $Y_0$, $Y_1$, $Y_2$, $Y_3$, $U_0$, $U_1$, $V_0$, and $V_1$, in a frame macroblock. In field macroblocks, ACPREDTFIELD indicates whether AC prediction is used for blocks $Y_0$, $Y_1$, $U_0$, and $V_0$, and ACPREDBFIELD indicates whether AC prediction is used for blocks $Y_2$, $Y_3$, $U_1$, and $V_1$. Alternatively, an encoder signals AC prediction in some other manner or at some other level.

C. Motion Vector Information in Inter-coded Interlaced Frames

As explained above, macroblocks are classified as frame macroblocks or field macroblocks and can be intra-coded or inter-coded. Thus, macroblocks can be one of four types: inter-coded frame macroblocks, inter-coded field macroblocks, intra-coded frame macroblocks, or intra-coded field macroblocks. Inter-coded macroblocks are motion compensated using motion vectors. For example, in P-frames, inter-coded frame macroblocks are motion compensated using one motion vector.

In some embodiments, inter-coded field macroblocks can have either one motion vector or two motion vectors. For example, when an inter-coded field macroblock has two motion vectors, each of the two fields in the macroblock has its own motion vector. On the other hand, when an inter-coded field macroblock has one motion vector, one of the two fields is intra-coded (not motion compensated) while the other field is inter-coded (motion compensated).

1. Motion Vector Predictors in Interlaced P-Frames

In general, motion vectors are computed by adding the motion vector differential to a motion vector predictor. In some embodiments, the motion vector predictor is computed using motion vectors from three neighboring macroblocks. For example, an encoder/decoder computes the motion vector predictor for a current macroblock by analyzing motion vector predictor candidates of the left, top, and top-right macroblocks. The motion vector predictor candidates are computed based on the current macroblock type.

FIGS. 20A and 20B show motion vector predictor candidates for frame macroblocks, and FIGS. 21A and 21B show motion vector predictor candidates for field macroblocks. For example, FIG. 20A shows predictors for finding a motion vector for a current frame macroblock 2010 that is not the last macroblock in a macroblock row, while FIG. 20B shows predictors for finding a motion vector where the current frame macroblock 2010 is the last macroblock in a macroblock row. The predictor candidates are computed differently depending on the whether the neighboring macroblock is frame-coded or field-coded. If the neighboring macroblock is frame-coded, its motion vector is taken as the predictor candidate. On the other hand, if the neighboring macroblock is field-coded, its top and bottom field motion vectors are averaged to form the predictor candidate.

FIG. 21A shows predictors for finding one or more motion vectors for a current field macroblock 2110 that is not the last macroblock in a macroblock row, while Figure and 21B shows predictors for finding one or more motion vectors where the current field macroblock 2110 is the last macroblock in a macroblock row. Motion vectors for the corresponding fields of the neighboring macroblocks are used as predictor candidates. If a neighboring macroblock is field-coded, the predictor candidate for the top field is taken from the neighboring macroblock's top field, and the predictor candidate for the bottom field is taken from the neighboring macroblock's bottom field. When a neighboring macroblock is frame-coded, each of the motion vectors corresponding to its two fields are deemed to be equal to the motion vector for the macroblock as a whole. In other words, the top field and bottom field motion vectors are set to V, where V is the motion vector for the entire macroblock.

In both cases, if there are no motion vectors for the candidate neighboring field or macroblock (e.g., the field or macroblock is intra coded), the motion vector for the candidate neighboring field or macroblock is set to be zero.

The predictor is calculated by taking the component-wise median of the three candidate motion vectors. For more information on median-of-three prediction, see U.S. patent application Ser. No. 10/622,841, entitled, "Coding of Motion Vector Information," filed concurrently herewith, Alternativety, the predictor is calculated using some other method.

2. Derivation of Chrominance Motion Vectors from Luminance Motion Vectors

In some embodiments, an encoder/decoder derives chrominance motion vectors from luminance motion vectors. For example, an encoder/decoder reconstructs a chrominance motion vector for a macroblock from the corresponding frame/field luminance motion vector. For frame-coded macroblocks, there will be one chrominance motion vector corresponding to the single luminance motion vector for the macroblock. On the other hand, for field-coded macroblocks, there will be two chrominance motion vectors corresponding to the two luminance motion vectors for the macroblock (e.g., one motion vector for the top field and one motion vector for the bottom field).

An encoder/decoder can use the same rules for deriving chrominance motion vectors for both field and frame macroblocks; the derivation is only dependent on the luminance motion vector, and not the type of macroblock. In some embodiments, chrominance motion vectors are derived according to the following pseudo-code:

```
frac_x4=(lmv_x<<2) % 16;

int_x4=(lmv_x<<2)-frac_x;

ChromaMvRound [16]={0, 0, 0, 0.25, 0.25, 0.25, 0.5,
    0.5, 0.5, 0.5, 0.5, 0.75, 0.75, 0.75, 1, 1};

cmv_y=lmv_y;

cmv_x=Sign (lmv_x)*(int_x4>>2)+ChromaMvRound
    [frac_x4];
``` cmv_x and cmv_y are chrominance motion vector components and lmv_x and lmv_y are corresponding luminance motion vector components. cmv_x is scaled by four while cmv_y is not scaled. The 4:1:1 format of the macroblock requires no scaling of in the y dimension. This derivation technique is therefore well-suited for a 4:1:1 macroblock format. The scaled cmv_x is also rounded to a quarter-pixel location. Rounding leads to lower implementation costs by favoring less complicated positions for interpolation (e.g., integer and half-integer locations).

After $cmv_{13}$ x and cmv_y are computed, the encoder/decoder can check to see if components should be pulled back (e.g., if the components map to an out-of-frame macroblock.) For more information on motion vector pull-back techniques, see U.S. patent application Ser. No. 10/622,841, entitled, "Coding of Motion Vector Infonnation," filed concurrently herewith.

3. Motion Compensation

A decoder uses a decoded motion vector to obtain a prediction macroblock (or field within a macroblock, etc.) in a reference frame. The horizontal and vertical motion vector components represent the displacement between the macroblock currently being decoded and the corresponding location in the reference frame. For example, positive values can represent locations that are below and to the right of the current location, while negative values can represent locations that are above and to the left of the current location.

If a current macroblock is frame-coded, one motion vector is used to obtain a prediction macroblock. In some embodiments, a decoder uses bi-cubic interpolation to obtain sub-pixel displacement. On the other hand, if the current macroblock is field-coded, the top field and bottom field have their own corresponding motion vectors. Accordingly, in some embodiments, given a field motion vector that points to a starting location in the reference frame, a decoder uses bi-cubic interpolation, taking alternating lines starting from the starting location, to compute the prediction field.

D. Interlaced B-frames

In some embodiments, a video encoder/decoder uses interlaced B-frames. For example, a video encoder/decoder encodes/decodes interlaced B-frames comprising macroblocks in a 4:1:1 format.

As explained above, in some embodiments, an encoder encodes macroblocks either as frame type or field type. For interlaced P-frames, an inter-coded field macroblock can have either one motion vector or two motion vectors. When an inter-coded field macroblock in a P-frame has two motion vectors, each of the two fields in the macroblock has its own motion vector and is compensated to form the residual. On the other hand, when an inter-coded field macroblock contains only one motion vector, one of the two fields is intra-coded while the other field is inter-coded.

In progressive B-frames, a macroblock can have from zero to two motion vectors, depending on the prediction mode for the macroblock. For example, in an encoder using five prediction modes (forward, backward, direct, interpolated and intra), forward and backward mode macroblocks have one motion vector for predicting motion from a previous reference or future frame. Direct mode macroblocks have zero motion vectors because in direct mode an encoder derives implied forward and backward pointing motion vectors—no actual motion vectors are sent for direct macroblocks. Intra mode macroblocks also have zero motion vectors. Interpolated mode macroblocks have two motion vectors (e.g., a backward motion vector and a forward motion vector).

For interlaced B-frames, an inter-coded field macroblock can have from zero to four motion vectors because each field can have from zero to two motion vectors, depending on the prediction mode of the field. For example:

The encoder encodes no motion vector for the inter-coded field macroblock if both fields use direct or intra mode.

The encoder encodes one motion vector if one field is either forward or backward predicted and the other field uses direct or intra mode.

The encoder encodes two motion vectors if both fields use forward or backward prediction, or if the interpolated mode is used to predict one field and the other field uses direct or intra mode.

The encoder encodes four motion vectors if both fields use the interpolated mode.

The set of possible motion vector combinations for a frame type B-frame macroblock is identical to the set of possible motion vector combinations for a progressive B-frame macroblock.

Although no motion vectors are sent for macroblocks that use direct mode prediction, direct mode macroblocks in interlaced frames are still designated as either frame type (using one motion vector for motion compensation) or field type (using two motion vectors for motion compensation), followed by the appropriate motion vector scaling and motion compensation in each case. This enables direct mode macro blocks in interlaced frames to be processed differently under different motion scenarios for better compression.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of decoding a field-coded macroblock comprising one or more intra-coded blocks, the method comprising:

finding a DC differential for a current intra-coded block in the macroblock;

selecting a DC predictor from among plural candidate blocks according to a set of DC predictor selection rules, wherein the plural candidate blocks include a top block above the current block, a left block left of the current block, and a top-left block above and to the left of the current block, and wherein the set of DC predictor selection rules indicates the selected DC predictor as follows:

if the top-left block, the left block, and the top block are intra-coded, the selected DC predictor depends on respective DC values of the top-left block, the left block, and the top block;

if the top-left block is not intra-coded but the left block and the top block are intra-coded, the selected DC predictor depends on the respective DC values of the top block and the left block;

if the left block is not intra-coded but the top block is intra-coded, the selected DC predictor is the DC value of the top block;

if the top block is not intra-coded but the left block is intra-coded, the selected DC predictor is the DC value of the left block;

if the left block is not intra-coded and the top block is not intra-coded, DC prediction is skipped for the current block;

obtaining a DC value for the current block, wherein the obtaining comprises;

if DC prediction is skipped for the current block, using the DC differential as the DC value for the current block; and if DC prediction is used for the current block, adding the selected DC predictor to the DC differential; and using the DC value in reconstruction of the current block.

2. The method of claim 1 wherein any of the plural candidate blocks that is outside a picture boundary is treated as not being intra-coded according to the set of DC predictor selection rules.

3. A computerized method of encoding an interlaced macroblock, the method comprising:

selectively performing DC prediction for a current block in the interlaced macroblock, wherein the selectively performing DC prediction comprises selecting DC predictor from among plural candidate blocks according to a set of DC predictor selection rules, wherein the plural candidate blocks include a top block above the current block, a left block left of the current block, and a top-left block above and to the left of the current block, and wherein the set of DC predictor selection rules indicates the selected DC predictor as follows;

if the top-left block, the left block, and the top block are intra-coded, the selected DC predictor depends on the respective DC values of the top-left block, the left block, and the top block;

if the top-left block is not intra-coded but the left block and the top block are intra-coded, selected DC predictor depends on the respective DC values of the top block and the left block;

if the left block is not intra-coded but the top block is intra-coded, the selected DC predictor is the DC value of the top block;

if the top block is not intra-coded but the left block is intra-coded, the selected DC predictor is the DC value of the left block;

if the left block is not inter-coded and the top block is not intra-coded DC prediction is skinned for the current block;

selectively performing AC prediction for the current block in the macroblock according to a set of AC prediction rules when the AC prediction is enabled, wherein the set of AC prediction rules indicates how to selectively perform the AC prediction as follows;

differentially coding top row AC coefficients for the current block if the selected DC predictor is from the top block;

differentially coding left column AC coefficients for the current block if the selected DC predictor is from the left block; and skipping differential coding of AC coefficients for the current block if DC prediction is skipped for the current block;

entropy coding results of the selectively performed DC prediction and AC prediction; and outputting results of the entropy coding.

4. The method of claim 3 further comprising, in a bit stream, signaling whether AC prediction is enabled for blocks in the macroblock.

5. The method of claim 4 wherein the macroblock is a frame macroblock, and wherein the signaling comprises sending a one-bit flag indicating whether AC prediction is performed for all blocks in the frame macroblock.

6. The method of claim 4 wherein the interlaced macroblock is a field macroblock., and wherein the signaling comprises sending a one-bit flag indicating whether AC prediction is performed for blocks in a first field in the field macroblock.

7. The method of claim 6 wherein the signaling further comprises sending a one-bit flag indicating whether AC prediction is performed for blocks in a second field in the field macroblock.

8. The method of claim 1 wherein the finding the DC differential comprises decoding an encoded DC differential.

9. One or more computer-readable media having stored thereon computer-executable instructions for causing one or more computers to perform a method comprising:

finding a DC differential for a current intra-coded block in a current macroblock of an interlaced video frame;

selecting a DC predictor from among plural candidate blocks according to a set of DC predictor selection rules, wherein the plural candidate blocks include a top block above the current block, a left block left of the current block, and top-left block above and to the left of the current block, and wherein the set of DC predictor selection rules indicates the selected DC predictor as follows:

if the top-left block, the left block and the top block are intra-coded, the selected DC predictor depends on respective DC values of the top-left block, the left block, and the top block;

if the top-left block is not intra-coded but the left block and the top block are intra-coded, the selected DC predictor depends on the respective DC values of the top block and the left block;

if the left block is not intra-coded but the top block is intra-coded, the selected DC predictor is the DC value of the top block;

if the top block is not intra-coded but the left block is intra-coded, the selected DC predictor is the DC value of the left block;

if the left block is not intra-coded and the top block is not intra-coded, DC prediction is skipped for the current block; obtaining a DC value for the current block, wherein the obtaining comprises if DC prediction is skipped for the current block, using the DC differential as the DC value for the current block; and if DC prediction is used for the current block, adding the selected DC predictor to the DC differential.

10. The computer-readable media of claim 9 wherein the finding the DC differential comprises decoding an encoded DC differential.

11. The computer-readable media of claim 9 wherein any of the plural candidate blocks that is outside a picture boundary is treated as not being intra-coded according to the set of DC predictor selection rules.

12. One or more computer-readable media having stored thereon computer-executable instructions for causing one or more computers to perform a method comprising:

selectively performing DC prediction for a current block in an interlaced macroblock, wherein the selectively performing DC prediction comprises selecting a DC predictor from among plural candidate blocks according to a set of DC predictor selection rules, wherein the plural candidate blocks include a top block above the current block, a left block left of the current block, and a top-left block above and to the left of the current block, and wherein the set of DC predictor selection rules indicates the selected DC predictor as follows:

if the top-left block, the left block, and the top block are intra-coded, the selected DC predictor depends on respective DC values of the top-left block, the left block, and the top block;

if the top-left block is not intra-coded but the left block and the top block are intra-coded, the selected DC predictor depends on the respective DC values of the top block and the left block;

if the left block is not intra-coded but the top block is intra-coded, the selected DC predictor is the DC value of the top block;

if the top block is not intra-coded but the left block is intra-coded, the selected DC predictor is the DC value of the left block;

if the left block is not intra-coded and the top block is not intra-coded, DC prediction is skipped for the current block; and selectively performing AC prediction for the current block in the interlaced macroblock according to a set of AC prediction rules when the AC prediction is enabled, wherein the set of AC prediction rules indicates how to selectively perform the AC prediction as follows;

differentially coding top row AC coefficients for the current block if the selected DC predictor is from the top block;

differentially coding left column AC coefficients for the current block if the selected DC predictor is from the left block; and skipping differential coding of AC coefficients for the current block-if DC prediction is skipped for the current block.

13. The computer-readable media of claim 12 wherein the method further comprises, in a bit stream, signaling whether AC prediction is enabled for blocks in the interlaced macroblock.

14. The computer-readable media of claim 13 wherein the interlaced macroblock is a frame macroblock, and wherein the signaling comprises sending a one-bit flag indicating whether AC prediction is performed for all blocks in the frame macroblock.

15. The computer-readable media of claim 13 wherein the interlaced macroblock is a field macroblock, and wherein the signaling comprises sending a one-bit flag indicating whether AC prediction is performed for blocks in a first field in the field macroblock.

16. The computer-readable media of claim 15 wherein the signaling further comprises sending a one-bit flag indicating whether AC prediction is performed for blocks in a second field in the field macroblock.

17. A system comprising:
means for finding a DC differential for a current intra-coded block in a current macroblock of an interlaced video frame;
means for selecting a DC predictor from among plural candidate blocks according to a set of DC predictor selection rules, wherein the plural candidate blocks include a top block above the current block, a left block left of the current block, and a top-left block above and to the left of the current block, and wherein the set of DC predictor selection rules indicates the selected DC predictor as follows:
if the top-left block the left, block, and the top block are intra-coded, the selected DC predictor depends on respective DC values of the top-left block, the left block, and the top block;
if the top-left block is not intra-coded but the left block and the top block are intra-coded, the selected DC predictor depends on the respective DC values of the top block and the left block;
if the left block is not intra-coded butte top block is intra-code, the selected DC predictor is the DC value of the top block;
if the top block is not intra-coded but the left black is intra-coded, the selected DC predictor is the DC value of the left block;
if the left block is not intra-coded and the top block is not intra-coded, DC prediction is skipped for the current block; and
means for obtaining a DC value for the current block, wherein the obtaining comprises:
if DC prediction is skinned for the current block, using the DC differential as the DC value for the current block; and
if DC prediction is used for the current block, adding the selected DC predictor to the DC differential.

18. The system of claim 17 wherein the means for finding the DC differential comprises means for decoding an encoded DC differential.

19. The system of claim 17 wherein any of the plural candidate blocks that is outside a picture boundary is treated as not being intra-coded according to the set of DC predictor selection rules.

20. A system comprising:
means for selectively performing DC prediction for a current block in an interlaced macroblock, wherein the selectively performing DC prediction comprises selecting a DC predictor from among plural candidate blocks according to a set of DC predictor selection rules, wherein plural candidate blocks include a top block above the current block, a left block left of the current block, and a top-left block above and to the left of the current block, and wherein the set of DC predictor selection rules indicates the selected DC predictor as follows:
if the top-left block, the left block, and the top block are intra-coded, the selected DC predictor depends on respective DC values of the top-left block, the left block, and the top block;
if the top-left block is not intra-coded but the left block and the top block are intra-coded, the selected DC predictor depends on the respective DC values of the top block and the left block;
if the left block is not intra-coded but the top block is intra-coded, the selected DC predictor is the DC value of the top block;
if the top block is not intra-coded but the left block is intra-coded, the selected DC predictor is the DC value of the left block;
if the left block is not intra-coded and the top block is not intra-coded, DC prediction is skipped for the current block; and
means for selectively performing AC prediction for the current block in the interlaced macroblock according to a set of AC prediction rules when the AC prediction is enabled, wherein the set of AC prediction rules indicates how to selectively perform the AC prediction as follows:
differentially coding top row AC coefficients for the current block if the selected DC predictor is from the top block;
differentially coding left column AC coefficients for the current block if the selected DC predictor is from the left block; and
skipping differential coding of AC coefficients for the current block if DC prediction is skipped for the current block.

21. The system of claim 20 further comprising means for signaling in a bit stream whether AC prediction is enabled for blocks in the interlaced macroblock.

22. The system of claim 21 wherein the interlaced macroblock is a frame macroblock, and wherein the means for signaling comprises means for sending a one-bit flag indicating whether AC prediction is performed for all blocks in the frame macroblock.

23. The system of claim 21 wherein the interlaced macroblock is a field macroblock, and wherein the means for signaling comprises means for sending a one-bit flag indicating whether AC prediction is performed for blocks in a first field in the field macroblock.

24. The system of claim 23 wherein the means for signaling further comprises means for sending a one-bit flog indicating whether AC prediction is performed for blocks in a second field in the field macroblock.

25. The method of claim 1 further comprising selectively performing AC prediction for the current block according to a set of AC prediction rules when the AC prediction is enabled, wherein the set of AC prediction rules indicates how to selectively perform the AC prediction as follows:
differentially coding top row AC coefficients for the current block if the selected DC predictor is from the top block;
differentially coding left column AC coefficients for the current block if the selected DC predictor is from the left block; and skipping differential coding of AC coefficients for the current block if DC prediction is skipped for the current block.

26. The computer-readable media of claim 9 wherein the method further comprises selectively performing AC prediction for the current block according to a set of AC prediction rules when the AC prediction is enabled, wherein the set of AC prediction rules indicates how to selectively perform the AC prediction as follows:

- differentially coding top row AC coefficients for the current block if the selected DC predictor is from the top block;
- differentially coding left column AC coefficients for the current block if the selected DC predictor is from the left block; and
- skipping differential coding of AC coefficients for the current block if DC prediction is skipped for the current block.

27. The system of claim 17 further comprising means for selectively performing AC prediction for the current block according to a set of AC prediction rules when the AC prediction is enabled, wherein the set of AC prediction rules indicates how to selectively perform the AC prediction as follows:

- differentially coding top row AC coefficients for the current block if the selected DC predictor is from the top block;
- differentially coding left column AC coefficients for the current block if the selected DC predictor is from the left block; and
- skipping differential coding of AC coefficients for the current block if DC prediction is skipped for the current block.

* * * * *

UNITED STATES PATENT AND TRADEMARK OFFICE
CERTIFICATE OF CORRECTION

| | | |
|---|---|---|
| PATENT NO. | : 7,426,308 B2 | Page 1 of 1 |
| APPLICATION NO. | : 10/622284 | |
| DATED | : September 16, 2008 | |
| INVENTOR(S) | : Hsu et al. | |

It is certified that error appears in the above-identified patent and that said Letters Patent is hereby corrected as shown below:

In column 20, line 60, in Claim 3, after "selecting" insert -- a --.

In column 21, line 6, in Claim 3, before "selected" insert -- the --.

In column 21, line 16, in Claim 3, after "intra-coded" insert -- . --.

In column 21, line 43, in Claim 6, delete "macroblock.," and insert -- macroblock, --, therefor.

In column 21, line 64, in Claim 9, after "left block" insert -- . --.

In column 22, line 14, in Claim 9, after "comprises" insert -- ; --.

In column 23, line 2, in Claim 12, delete "block-if" and insert -- block if --, therefor.

In column 23, line 34, in Claim 17, delete "block the left, block," and insert -- block, the left block, --, therefor.

In column 23, line 42, in Claim 17, after "intra-coded" delete "butte" and insert -- but the --, therefor.

In column 23, line 43, in Claim 17, delete "intra-code," and insert -- intra-coded, --, therefor.

In column 23, line 45, in Claim 17, after "left" delete "black" and insert -- block --, therefor.

In column 23, line 53, in Claim 17, delete "skinned" and insert -- skipped --, therefor.

In column 24, line 4, in Claim 20, after "wherein" insert -- the --.

In column 24, line 54, in Claim 24, after "one-bit" delete "flog" and insert -- flag --, therefor.

Signed and Sealed this
Nineteenth Day of April, 2011

David J. Kappos
*Director of the United States Patent and Trademark Office*